(12) United States Patent
Hiramatsu et al.

(10) Patent No.: US 7,023,479 B2
(45) Date of Patent: Apr. 4, 2006

(54) IMAGE INPUT APPARATUS HAVING ADDITION AND SUBTRACTION PROCESSING

(75) Inventors: Makoto Hiramatsu, Kanagawa (JP); Motohiro Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 09/853,706

(22) Filed: May 14, 2001

(65) Prior Publication Data
US 2002/0085112 A1 Jul. 4, 2002

(30) Foreign Application Priority Data
May 16, 2000 (JP) .............................. 2000-143593
May 16, 2000 (JP) .............................. 2000-144052

(51) Int. Cl.
H04N 9/64 (2006.01)
H04N 5/238 (2006.01)

(52) U.S. Cl. ...................................... 348/243; 348/367

(58) Field of Classification Search ................ 348/241, 348/243, 245, 246, 250, 251, 362, 367, 231.99, 348/607, 618, 620; 382/274, 275; 358/463, 358/518, 521; 250/208.1
See application file for complete search history.

(56) References Cited

U.S. PATENT DOCUMENTS

| 4,614,966 A | 9/1986 | Yunoki et al. ................ 358/44 |
| 4,845,566 A | 7/1989 | Sakai et al. ............. 358/213.24 |
| 5,812,703 A | 9/1998 | Juen et al. .................. 382/274 |
| 5,925,875 A * | 7/1999 | Frey ........................ 250/208.1 |
| 5,926,214 A * | 7/1999 | Denyer et al. .............. 348/241 |
| 6,005,615 A * | 12/1999 | Tsuda ......................... 348/243 |
| 6,061,092 A * | 5/2000 | Bakhle et al. .............. 348/243 |
| 6,084,634 A * | 7/2000 | Inagaki et al. ............. 348/294 |
| 6,101,287 A * | 8/2000 | Corum et al. ............... 382/274 |
| 6,133,862 A * | 10/2000 | Dhuse et al. ............... 341/118 |
| 6,144,408 A * | 11/2000 | MacLean .................... 348/241 |
| 6,563,536 B1* | 5/2003 | Rashkovskiy et al. ....... 348/243 |
| 6,839,153 B1* | 1/2005 | Shimizu .................... 358/3.21 |

OTHER PUBLICATIONS

European Search Report (Ref. No. IM/2765030) dated Aug. 28, 2001.
European Search Report (Ref. No. IM/2765030) dated Nov. 2, 2001.

* cited by examiner

*Primary Examiner*—Thai Tran
*Assistant Examiner*—Justin Misleh
(74) *Attorney, Agent, or Firm*—Fitzpatrick, Cella, Harper & Scinto

(57) ABSTRACT

Image data having a high S/N ratio is obtained even when the exposure time is relatively long. To achieve the above object, there is provided an image input apparatus in which an accumulation mode is set with the shutter open, thereby acquiring image data A1. The shutter is then closed, and the accumulation mode is set to acquire subtraction data between the image data and black image data A2. This processing is repeated to acquire image data A1 and subtraction data A2, and these subtraction data are added. These operations A1, A2, and A3 are repeated a predetermined number of times to update addition data, and image processing is performed on the basis of the updated addition data.

10 Claims, 31 Drawing Sheets

IMAGE INPUT APPARATUS HAVING ADDITION AND SUBTRACTION PROCESSING

BACKGROUND OF THE INVENTION

1. Field of the Invention

The present invention relates to an image input apparatus such as a digital camera or image scanner, and a method of processing input image data input to the image input apparatus.

2. Related Background Art

An image input apparatus as shown in FIG. 1 is conventionally known. This image input apparatus includes a lens 101, a solid-state image pickup element 102, and a shutter (movable shielding member) 103 for controlling incident light to the solid-state image pickup element 102. Under the control of a CPU 108, a shutter driving device 104 controls opening/closure of the shutter 103, and an image pickup element driving circuit 105 controls driving of the solid-state image pickup element 102.

In this image input apparatus, when the shutter driving device 104 opens the shutter 103, an image of an object is formed on the solid-state image pickup element 104 via the lens 101.

The image pickup element driving circuit 105 has an operation mode control function for setting an accumulation mode in which optical information on the solid-state image pickup element 102 is converted into an analog electrical signal and accumulated, and a read-out mode in which the accumulated image pickup data (analog electrical signal) is read out. The analog electrical signal accumulated in the solid-state image pickup element 102 and read out from it is converted into a digital electrical signal by an A/D converter 106, stored in a memory 107, and processed by an image processor (not shown).

FIG. 2 is a timing chart showing the relationship between the open/close timing of the shutter and the operation mode of the solid-state image pickup element.

First, the operation mode of the solid-state image pickup element 102 is set to the accumulation mode with the shutter 103 closed, and the shutter 103 is opened for a predetermined time s. When this predetermined time s has elapsed, the shutter 103 is closed. After that, the solid-state image pickup element 102 is set to the read-out mode by the image pickup element driving circuit 105 to perform an image pickup data read-out process. The readout image data is stored in the memory and subjected to image processing.

When a CMOS sensor is used as the solid-state image pickup element 102, as shown in FIG. 3, the image pickup element driving circuit 105 outputs an all-pixel reset pulse to remove electric charge accumulated in all pixels of the solid-state image pickup element 102. At the same time, the operation mode is set to the accumulation mode to start accumulating new optical information.

It is known that the solid-state image pickup element 102 has noise so-called fixed pattern noise. It is also known that in order to remove this fixed pattern noise, black image data is subtracted from image data, and image processing is performed on the basis of this subtracted data.

FIG. 4 is a timing chart showing the relationship among the open/close timing of the shutter, the generation timing of the reset pulse, and the operation mode of the solid-state image pickup element when the above subtraction is performed.

Similar to FIG. 3, the solid-state image pickup element 102 is set to the accumulation mode at the same time the all-pixel reset pulse is generated. The shutter 103 is opened, and then closed when the predetermined time s has elapsed. Subsequently, the operation mode is switched to the read-out mode to read out image data. That is, image data of an object is accumulated by setting an accumulation mode time t to be slightly longer than the predetermined time s during which the shutter 103 is opened. When the shutter 103 is closed, the operation mode of the solid-state image pickup element 102 is changed to the read-out mode to read out the image data. The readout image data is stored in the memory 107.

When the image data read-out process is completed, another all-pixel reset pulse is generated, and at the same time the solid-state image pickup element 102 is set to the accumulation mode. That is, the operation mode of the solid-state image pickup element 102 is set to the accumulation mode for the same time period (accumulation mode time t) as the accumulation mode when the shutter is open, thereby accumulating black image data. When the accumulation mode time t has elapsed, the operation mode is switched to the read-out mode to read out the black image data. The readout image data is stored as black image data in the memory 107. After that, this black image data is subtracted from the image data obtained when the shutter is open, and image processing is performed on the basis of the difference. Consequently, a high-quality image from which the fixed pattern noise is removed can be obtained.

When the exposure time is short, as described above, this conventional image input apparatus can remove the fixed pattern noise and thereby obtain high-quality image data. However, if the exposure time is relatively long, the apparatus cannot control image data.

More specifically, a so-called dark current generally exists in an image pickup element, and the fixed pattern noise described above is presumably principally caused by the nonuniformity of this dark current. In addition, this dark current increases in proportion to the time of accumulation to the image pickup element.

In the conventional image input apparatus, therefore, in case of that the exposure time is short the fixed pattern noise can be removed by subtracting black image data from image data of an object. However, in case of that the exposure time is long, the amount of dark current increases, and this increases the level of black image data. This may narrow the dynamic range of image data.

Also, when photographing is performed for a long time by using a solid-state image pickup element 102 having a large dark current or when photographing is performed for a long time exceeding the capability of the solid-state image pickup element 102, black image data alone exceeds the input range of the A/D converter 106. This makes the user totally unable to obtain desired image data.

Furthermore, the above conventional image pickup element acquires the black image data only once. Hence, a random noise component when this black image data is acquired is added as fixed pattern noise of image data, leading to deterioration of the S/N ratio.

SUMMARY OF THE INVENTION

It is an object of the present invention to provide an image input apparatus and image data processing method capable of obtaining image data having a high S/N ratio even when the exposure time is relatively long.

According to an aspect of the present invention, there is provided an image input apparatus comprising:

an image pickup region including a plurality of pixels each for converting an optical image from an object into electrical image information and accumulating the electrical image information, and a processing circuit adapted to process the image information from the image pickup region, wherein the processing circuit generates image data by performing a subtraction operation and an addition operation on the basis of a plurality of first image information read out in a time-series manner from the same pixel during one exposure operation, and a plurality of second image information sequentially read out from the same pixel in a shielded state.

According to another aspect of the present invention, there is provided an image data generating method comprising:

a read-out step of reading out image information from an image pickup region including a plurality of pixels each for converting an optical image from an object into electrical image information and accumulating the image information; and a processing step of processing the readout image information, wherein the processing step comprises a step of generating image data by performing a subtraction operation and an addition operation on the basis of a plurality of first image information read out in a time-series manner from the same pixel during one exposure operation, and a plurality of second image information sequentially read out from the same pixel in a shielded state.

Other objects, features and advantages of the invention will become apparent from the following detailed description taken in conjunction with the accompanying drawings.

DESCRIPTION OF THE PREFERRED EMBODIMENTS

Embodiments of the present invention will be described in detail below with reference to the accompanying drawings.

Figure 1:
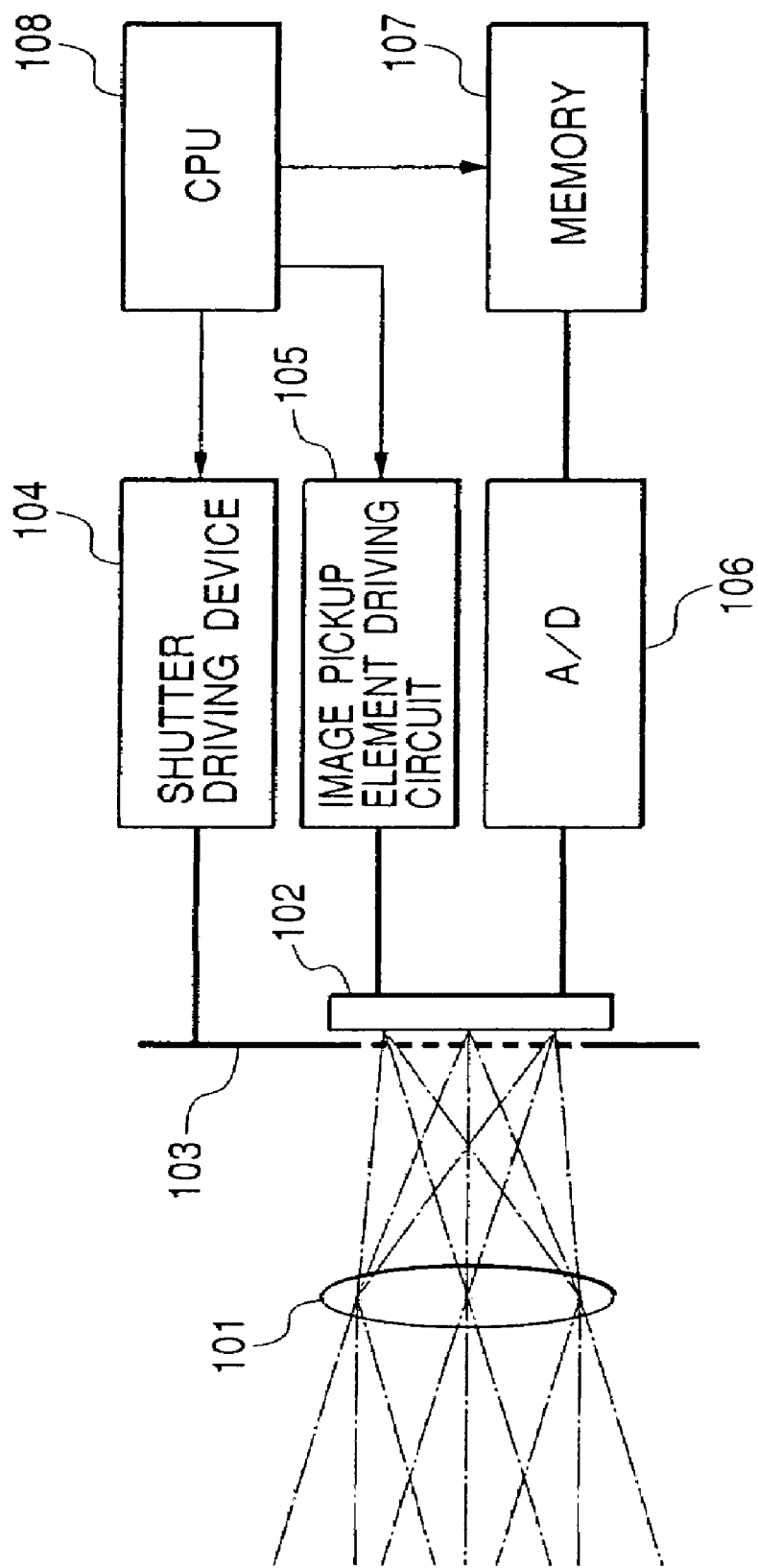
FIG. 1 is a block diagram of a conventional image input apparatus.
Figure 2:
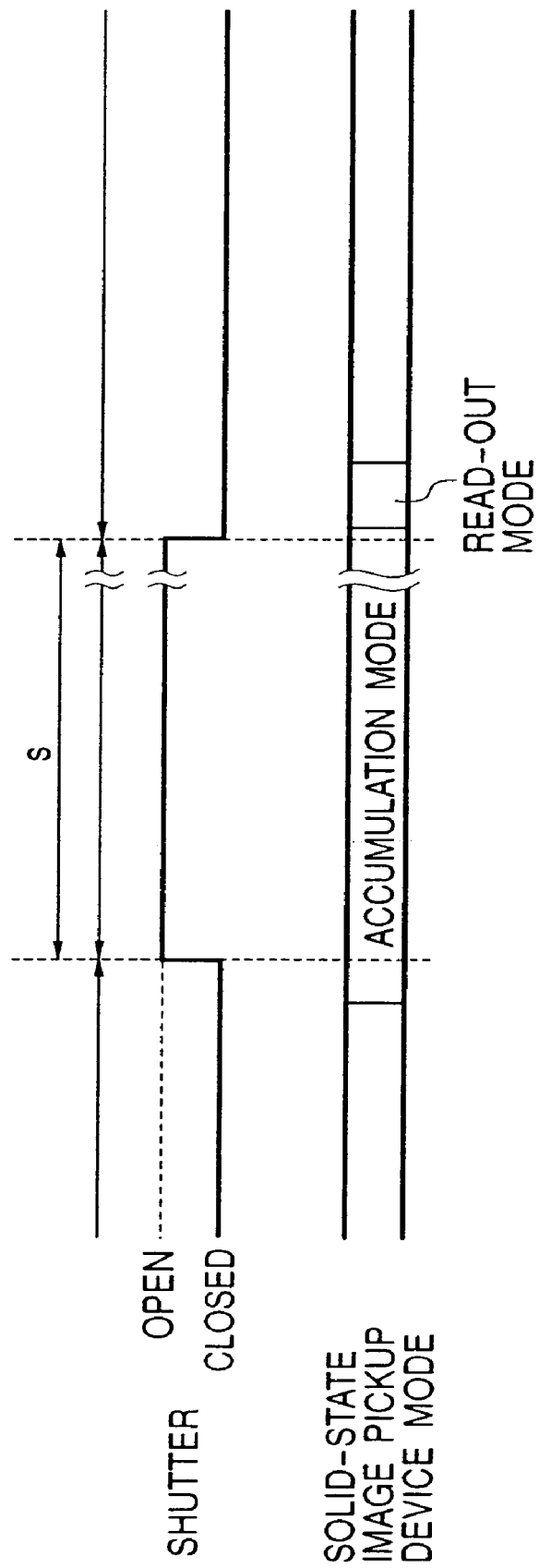
FIG. 2 is a timing chart of first prior art and shows the control timings of the image input apparatus.
Figure 3:
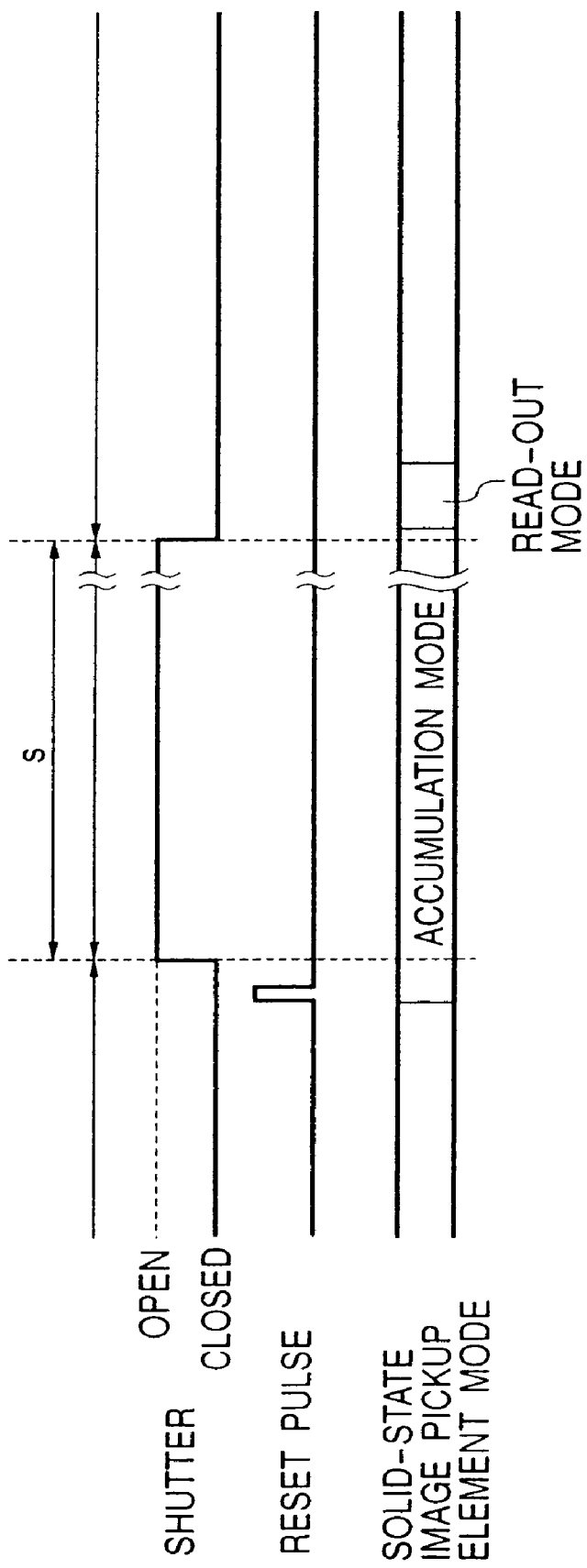
FIG. 3 is a timing chart of second prior art and shows the control timings of the image input apparatus.
Figure 4:
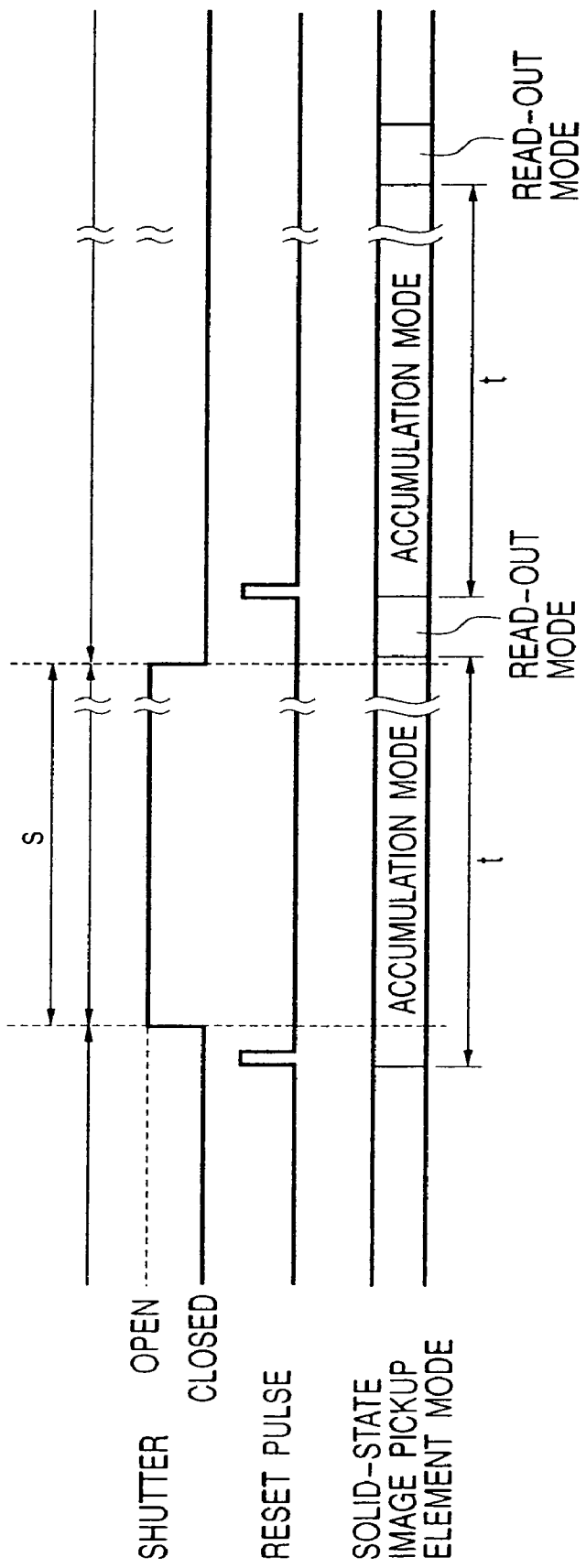
FIG. 4 is a timing chart of third prior art and shows the control timings of the image input apparatus.
Figure 5:
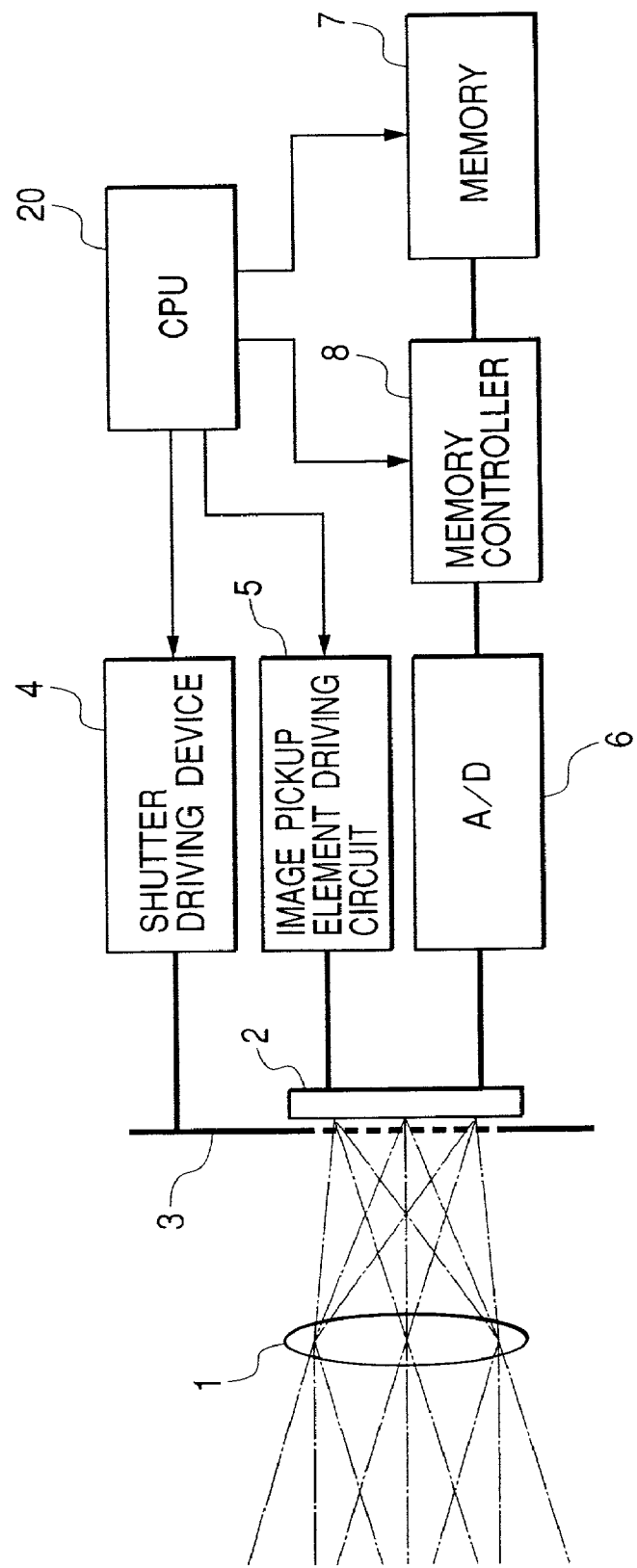
FIG. 5 is a block diagram showing an embodiment of an image input apparatus according to the present invention.

FIG. 5 is a block diagram showing an embodiment of an image input apparatus according to the present invention. This image input apparatus comprises a lens 1, a solid-state image pickup element 2, a shutter 3, a shutter driving device 4, an image pickup element driving circuit 5, an A/D converter 6, a memory 7, a memory controller 8, and a CPU 20. An optical image as an object enters the lens 1. The solid-state image pickup element 2 comprising a CCD or CMOS receives this optical image transmitted through the lens 1. The shutter 3 controls light incident to the solid-state image pickup element 2. The shutter driving device 4 controls opening/closure of the shutter 3. The image pickup element driving circuit 5 controls the operation of the solid-state image pickup element 2. The A/D converter 6 converts an analog electrical signal from the solid-state image pickup element 2 into a digital electrical signal. The memory 7 stores the image data converted into the digital signal by the A/D converter 6. The memory controller 8 is connected between the A/D converter 6 and the memory 7 to control information to be stored in the memory 7. The CPU 20 is connected to the shutter driving device 4, the image pickup element driving circuit 5, the memory 7, and the memory controller 8 and controls these components.

The image pickup element driving circuit 5 has an operation mode control function for setting an accumulation mode in which optical information formed on the solid-state image pickup element 2 is converted into an analog electrical signal and accumulated, and a read-out mode in which the accumulated image pickup data (analog electrical signal) is read out. This image pickup element driving circuit 5 also has a pulse generating function for generate an all-pixel reset pulse to the solid-state image pickup element 2 when a CMOS is used as the solid-state image pickup element 2.

In the image input apparatus having the above arrangement, when the shutter driving device 4 opens the shutter 3, an optical image of an object is formed on the solid-state image pickup element 2 via the lens 1. This optical information on the solid-state image pickup element 2 is accumulated in the solid-state image pickup element 2 under the control of the image pickup element driving circuit, and read out as an analog electrical signal. The readout analog electrical signal is converted into a digital signal by the A/D converter 6, and the digital signal is stored in the memory 7 via the memory controller 8.

Figure 6:
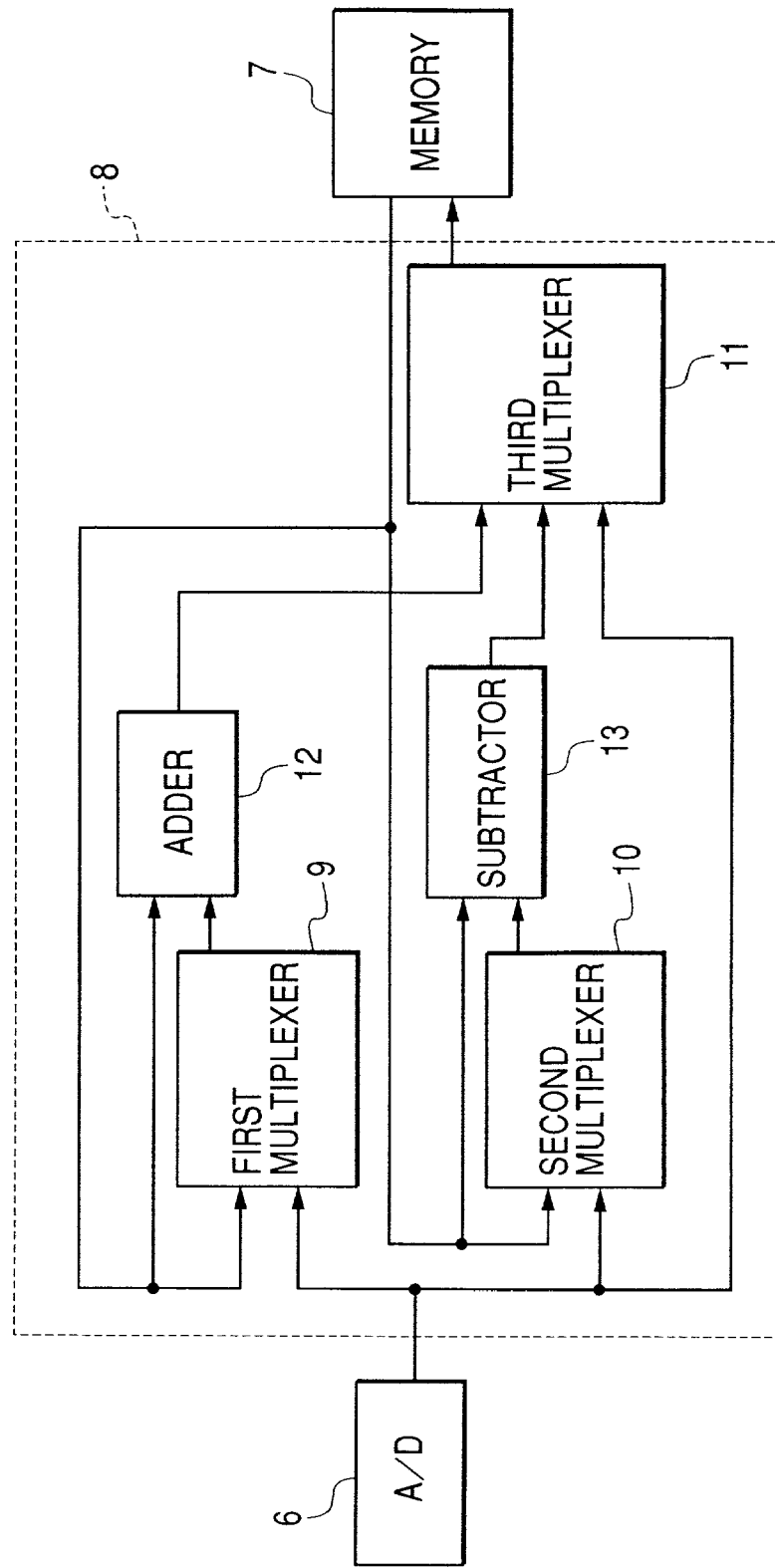
FIG. 6 is a block diagram showing details of a memory controller of the present invention.

FIG. 6 is a block diagram showing details of the memory controller 8.

Referring to FIG. 6, output image data (digital signal) from the A/D converter 6 is supplied to first to third multiplexers 9, 10, and 11. Also, image data (readout data) read out from the memory 7 is input to the first and second multiplexers 9 and 10.

Each of the first and second multiplexers 9 and 10 selects one of the image data from the A/D converter 6 and the memory 7. Output signals from these first and second multiplexers 9 and 10 are supplied to an adder 12 and a subtractor 13, respectively. The adder 12 adds the readout image data from the memory 7 and the output data from the first multiplexer 9. Consequently, the sum of the readout image data from the memory 7 and itself, or the sum of the readout image data from the memory 7 and the output image data from the A/D converter 6, is obtained.

The adder 12 includes a latch circuit or the like. To add the readout data from the memory 7, therefore, two data to be added can be output at different timings from the memory 7.

The subtractor 13 performs subtraction for the readout image data from the memory 7 and the output data from the second multiplexer 10. Consequently, the difference between those two readout image data from the memory 7, or the difference between the readout image data from the memory 7 and the output image data from the A/D converter 6, is obtained. This subtractor 13 has an inverting function capable of inverting the polarity of the output result.

The output signals from the adder 12 and the subtractor 13 are input to the third multiplexer 11. That is, this third multiplexer 13 receives the output signals from the adder 12, the subtractor 13, and the A/D converter 6, and selectively outputs these output signals to the memory 7. Accordingly, the output image data from one of the A/D converter 6, the adder 12, and the subtractor 13 is stored in the memory 7.

Figure 7:
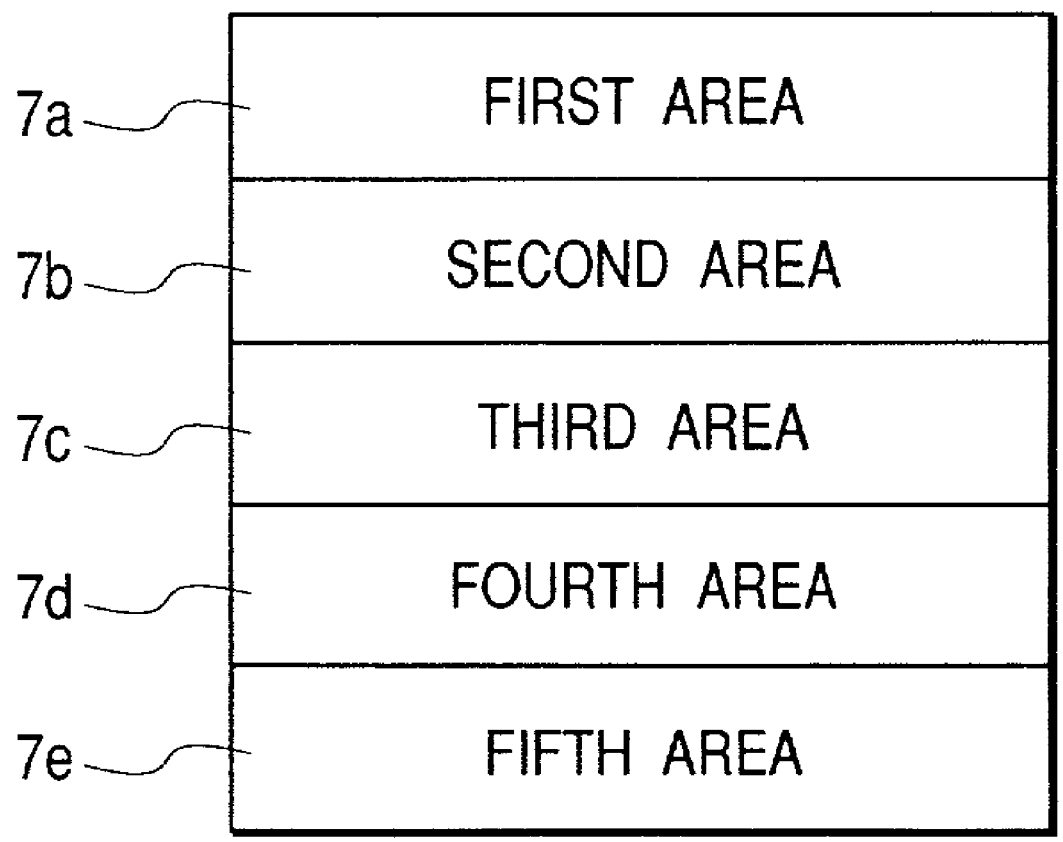
FIG. 7 shows the memory map of a memory.

FIG. 7 shows the memory map of the memory 7. This memory 7 is divided into five areas (first to fifth areas 7a to 7e). The CPU 20 determines addresses on the memory by mapping and stores the output result from the third multiplexer 13 in one of these first to fifth areas 7a to 7e. For example, the image data from the A/D converter 6 is stored in the first and third areas 7a and 7c, the image data from the subtractor 13 is stored in the second and fourth areas 7b and 7d, and the image data from the adder 12 is stored in the fifth area 7e.

Figure 8:
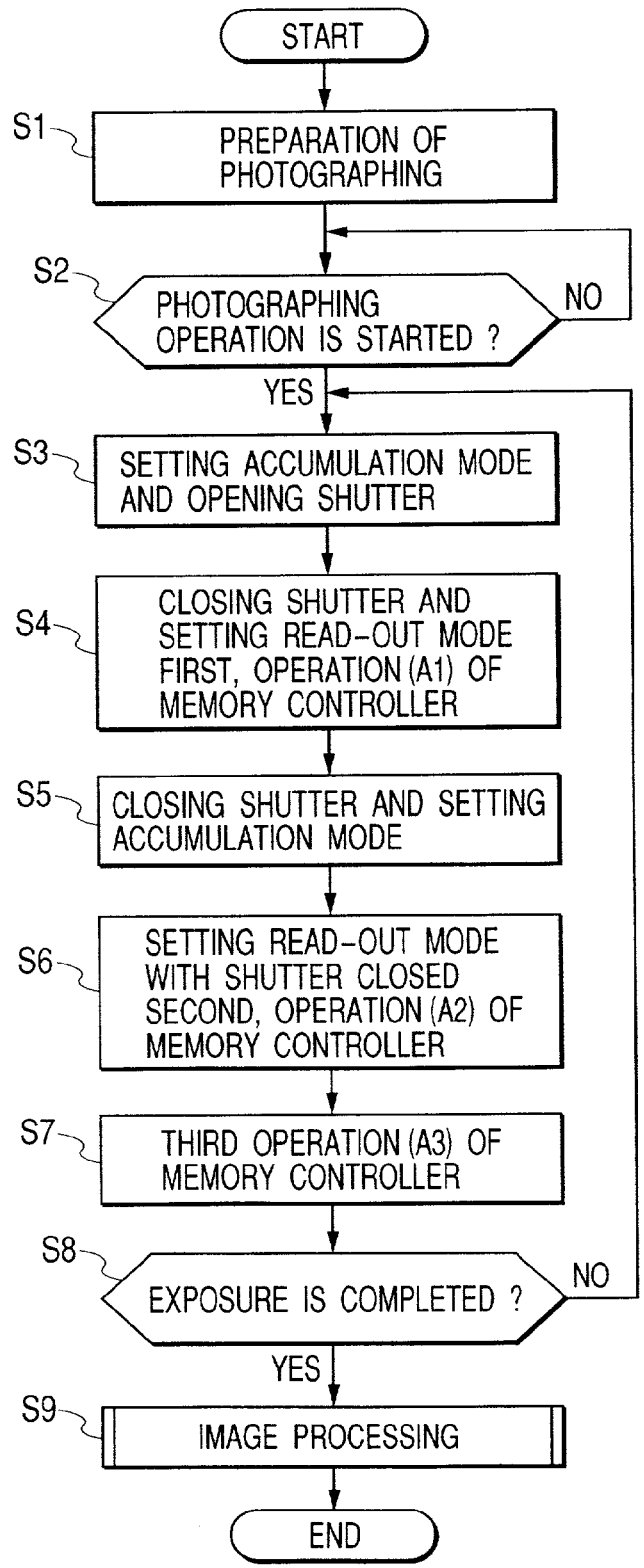
FIG. 8 is a flow chart showing the first embodiment of an image input apparatus control method according to the present invention.
Figure 9:
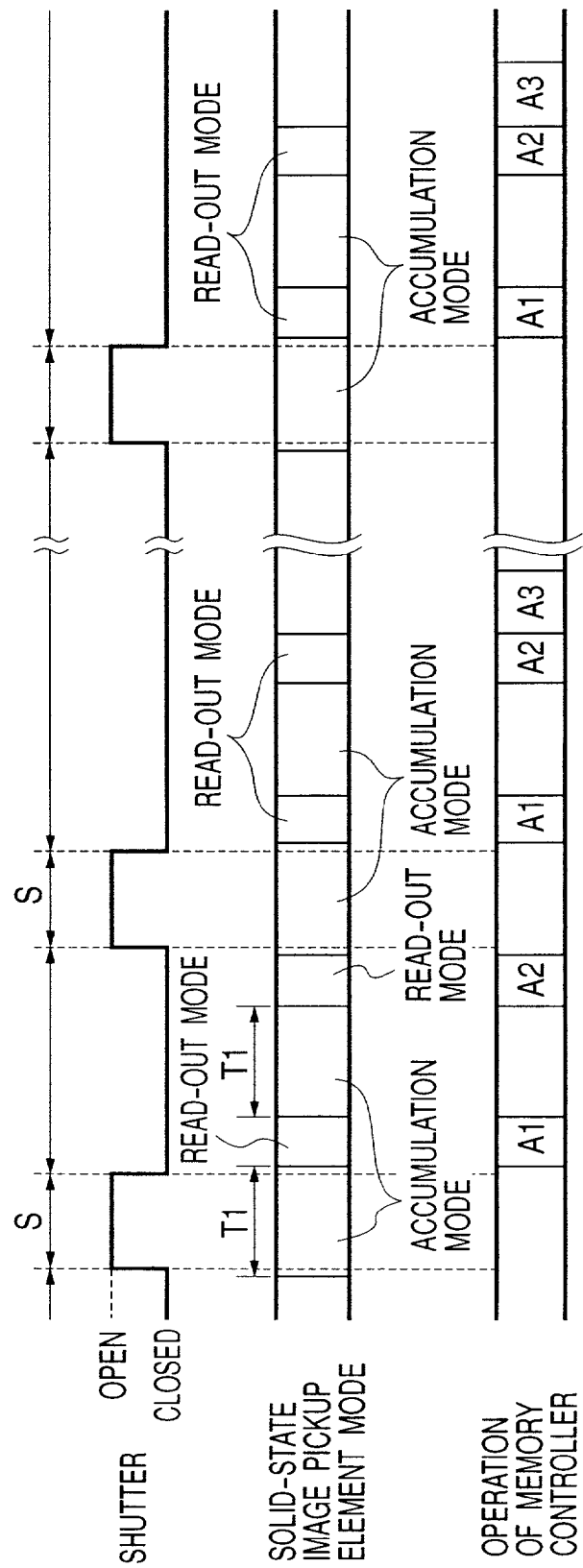
FIG. 9 is a timing chart showing the control timings of the first embodiment.

FIG. 8 is a flow chart showing the first embodiment of an image data processing method according to the present invention. FIG. 9 is a timing chart showing control timings when the program shown in FIG. 8 is executed.

When a photographic preparation start instruction is output, a preparation of photographing is performed in step S1, and a start instruction of the photographing operation start instruction is waited in step S2. When the photographing operation start instruction is generated, the flow advances to step S3. In step S3, the operation mode of the solid-state image pickup element is set to the accumulation mode as shown in FIG. 5, and the shutter 3 is opened. When a predetermined time S has elapsed, the flow advances to step S4 to close the shutter 3. After that, the solid-state image pickup element 2 is set in the read-out mode, and the readout image data is stored in the first area 7a of the memory 7 via the memory controller 8 (first operation A1).

That is, in this first operation A1, the third multiplexer 11 of the memory controller 8 outputs image data from the A/D converter 6. This image data from the A/D converter 6 is stored as image data (1) in the first area 7a of the memory 7. Note that the accumulation mode is set for a predetermined time T1 slightly longer than the predetermined time S1 during which the shutter 3 is opened, so that the mode is set over at least the opening time of the shutter 3.

In step S5, the solid-state image pickup element 2 is set in the accumulation mode with the shutter 3 closed. In step S6, the solid-state image pickup element 2 is switched to the read-out mode to read out image data, and the readout image data is stored in the memory 7 via the memory controller 8 (second operation A2).

In this second operation A2, switching is performed such that the second multiplexer 10 of the memory controller 8 outputs image data (black image data (1)) from the A/D converter 6. Accordingly, this image data (black image data (1)) from the A/D converter 6 is input to the subtractor 13. Meanwhile, the image data (1) obtained in step S4 is input from the memory 7 to the subtractor 13. So, the subtractor 13 performs subtraction between the image data (1) and the image data from the A/D converter 6 and outputs the difference therebetween to the memory 7. That is, in this case the polarity of the subtractor 13 is a sign of the difference of image data (1)—image data (black image data (1)) from A/D converter. This difference is stored as subtraction data (1) in the second area 7b of the memory 7.

Subsequently, the processing from step S3 to step S5 described above is repeated to store image data (2), obtained from the A/D converter 6 by the first operation A1, into the third area 7c, and store subtraction data (2) obtained from the subtractor 13 into the fourth area 7d.

After that, the flow advances to step S7, and the memory controller 8 proceeds to a third operation A3.

In this third operation A3, the subtraction data (1) and (2) stored in the second and fourth areas 7b and 7d, respectively, are output from the memory 7 and input to the adder 12 and the first multiplexer 9. The first multiplexer 9 outputs the subtraction data (1) or (2) obtained from the memory 7. Therefore, the subtraction data (1) and (2) are input to the adder 12, so the adder 12 adds these subtraction data (1) and (2). This sum is stored in the second area 7b of the memory 7. During this operation, the solid-state image pickup element 2 can be set in the accumulation mode to open the shutter 3.

In step S8, whether exposure is completed is checked. If exposure is not completed, the processing from step S3 to step S7 is repeated to sequentially add subtraction data (n).

When the processing from step S3 to step S7 is repeated n times and it is determined in step S8 that exposure is completed, addition data K1 given by $$K1 = \sum_{i=1}^{n} \{\text{image data}(i) - \text{black image data}(i)\} \quad (1)$$

is stored in the second area 7b of the memory 7. In step S9, image processing is executed on the basis of this addition data K1, and the whole processing is completed.

In the first embodiment as described above, image processing is performed on the basis of the addition data K1 of the subtraction data (n). Since this relatively lowers the level of black image data, fixed noise pattern can be removed even when the exposure time is long. Consequently, high-quality image data having a dynamic range not narrowed by a dark current and also having a high S/N ratio can be obtained.

Figure 10:
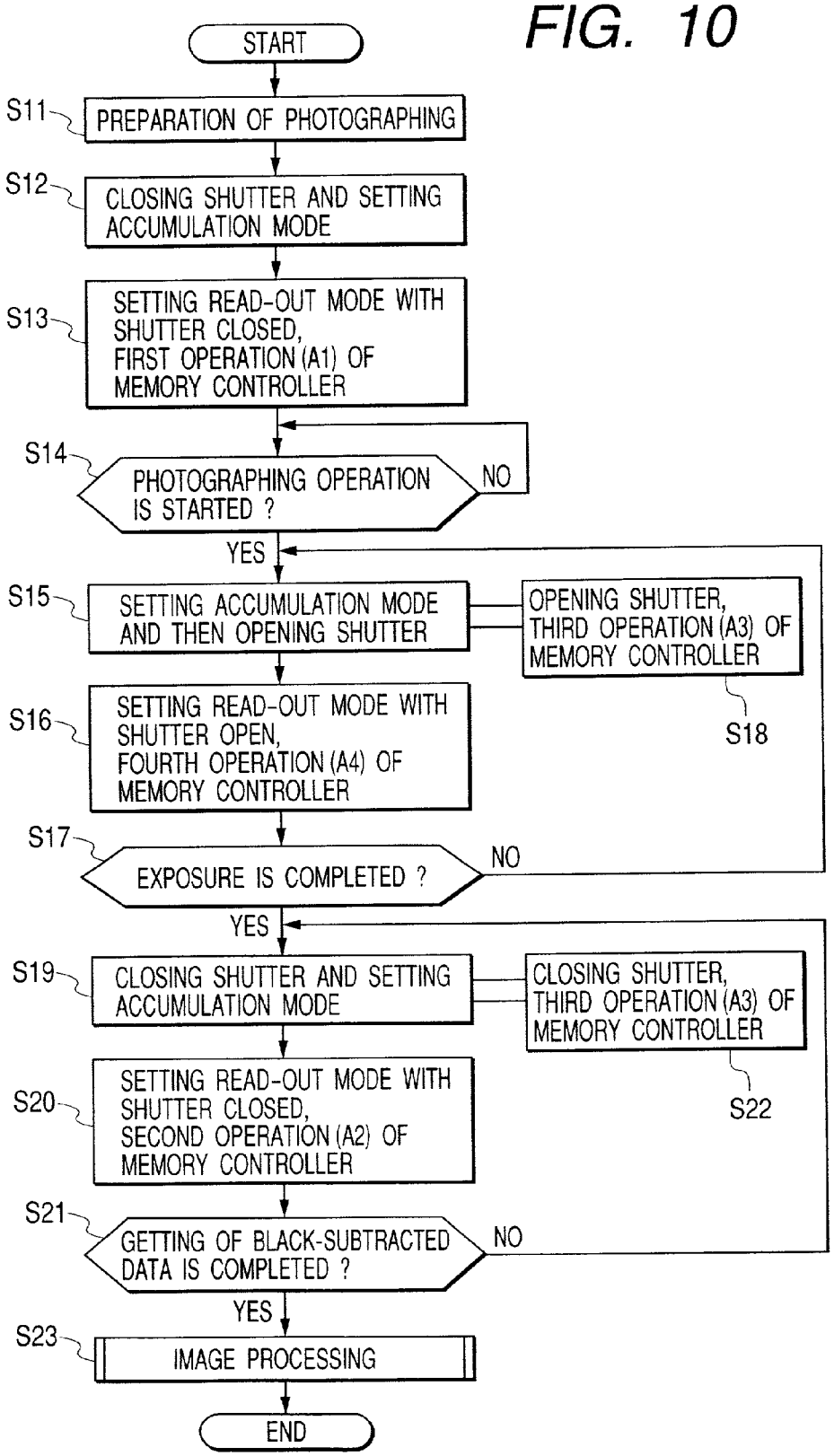
FIG. 10 is a flow chart showing the second embodiment of the image input apparatus control method according to the present invention.
Figure 11:
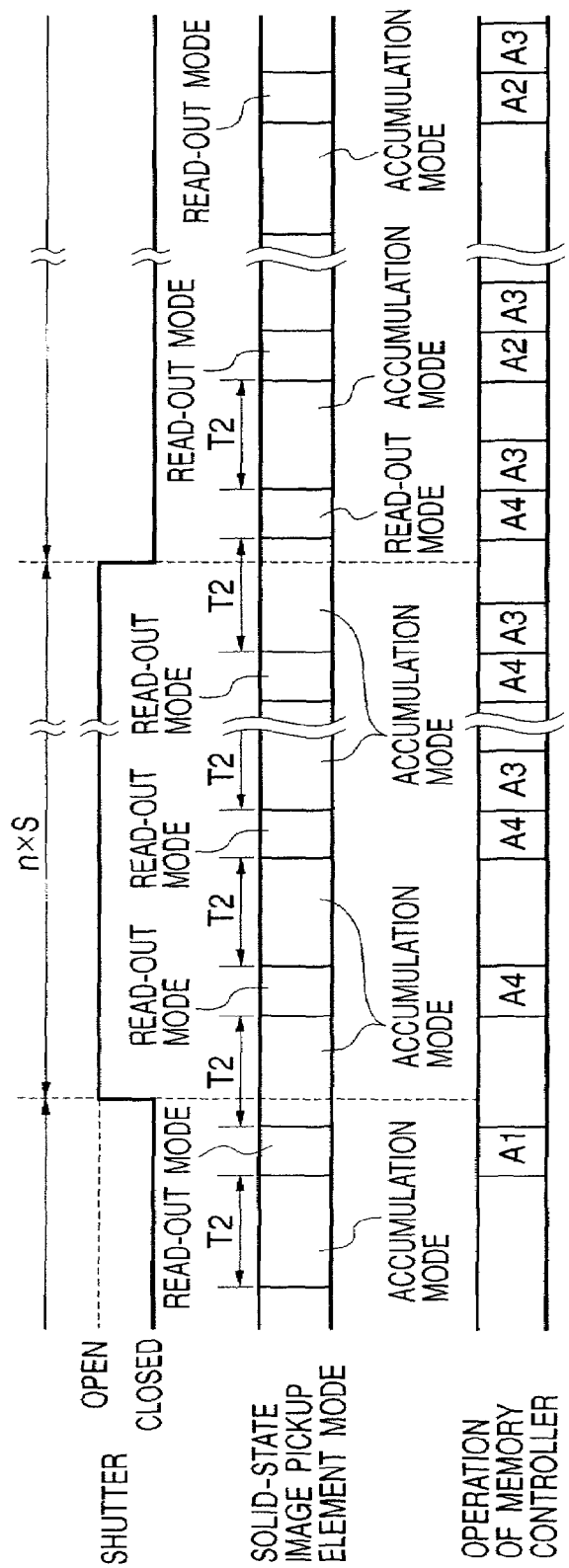
FIG. 11 is a timing chart showing the control timings of the second embodiment.

FIG. 10 is a flow chart showing the second embodiment of the image data processing method according to the present invention. FIG. 11 is a timing chart showing control timings when the program of FIG. 10 is executed.

When a photographing preparation instruction is output, a preparation of photographing is performed in step S11. In step S12, as shown in FIG. 11, the solid-state image pickup element 2 is set to the accumulation mode for a predetermined time T2 with the shutter 3 closed. In step S13, the operation mode of the solid-state image pickup element 2 is switched to the read-out mode to read out image data with the shutter 3 closed, and the readout image data is stored in the memory 7 via the memory controller 8 (first operation A1).

That is, as in the first embodiment, in this first operation A1 the image data from the A/D converter 6 is stored in the first area 7a of the memory 7. In the first operation A1 of this second embodiment, however, image data is read out with the shutter 3 closed, so black image data (0) is stored in the first area 7a.

In step S14, the start of a photographing operation is waited. When the photographing operation is started, the flow advances to step S15 to set the solid-state image pickup element 2 in the accumulation mode and open the shutter 3. After the solid-state image pickup element 2 is set in the accumulation mode for the same predetermined time T2 as in the previous accumulation mode, the flow advances to step S16. In step S16, the operation mode of the solid-state image pickup element 2 is switched to the read-out mode to read out image data with the shutter 3 open, and the readout image data is stored in the memory 7 via the memory controller 8 (fourth operation A4).

That is, in this fourth operation A4, image data from the A/D converter 6, i.e., image data (1) obtained when the shutter is open is output to the second multiplexer 10 of the memory controller 8. Also, the black image data (0) stored in the first area 7 a is output from the memory 7. Accordingly, the image data (1) and the black image data (0) are input to the subtractor 13. The subtractor 13 performs subtraction between the image data (1) and the black image data (0), and this difference is stored in the memory 7. The polarity of the subtractor 13 in this case is opposite to that in the first embodiment. That is, the difference of image data from A/D converter—black image data (0) is stored as subtraction data (1) in the second area 7b of the memory 7.

Steps S15 and S16 are repeated to acquire subtraction data (2) and store this data in the third area 7c.

After that, the flow advances to step S17 to check whether exposure is completed. If exposure is not completed, the flow returns to step S15 to set the solid-state image pickup element 2 in the accumulation mode while the shutter 3 is kept open. In addition, the memory controller 8 executes the third operation A3 in parallel with the image data accumulation process. That is, similar to the above first embodiment, the subtraction data (1) and (2) are added, and the addition data is stored in the second area 7b.

Subsequently, in step S16 the read-out mode is again set to read out image data with the shutter open, thereby acquiring subtraction data (2) and storing the data in the memory 7. The above processing is repeated until exposure is completed in step S17. When a predetermined time (n×S) has elapsed, the shutter 3 is closed. After that, the read-out mode is set only once to execute the fourth operation A4 and the third operation A3, thereby calculating subtraction data (m) when the shutter is open. Consequently, addition data K2 given by $$K2 = \sum_{i=1}^{m} \{\text{image data}(i) - \text{black image data}(0)\} \quad (2)$$

is stored in the second area 7b of the memory 7.

In this state, the processing from step S15 to S18 is repeated m times.

When exposure is completed, the flow advances to step S19, and the operation mode is set to the accumulation mode to accumulate image data with the shutter 3 closed. When the predetermined time T2 has elapsed, in step S20 the solid-state image pickup element 2 is switched to the read-out mode to read out the image data, and the readout image data is stored in the memory 7 by the memory controller 8 (second operation A2).

That is, the result of the subtraction performed between the output (black image data (1)) from the A/D converter 6 and the black image data (0) from the memory is stored as black-subtracted data (1), in the form of black image data (0)—image data (black image data (1) from A/D converter, into the fourth area 7d.

In step S21, whether the getting of the black-subtracted data is completed is checked. If NO in step S21, the flow returns to step S19 to set the operation mode to the accumulation mode with the shutter 3 closed, thereby accumulating image data, and the memory controller 8 executes the third operation A3. That is, the black-subtracted data (1) is added by using the addition data stored in the second area 7b, and the obtained addition data is stored in the second area 7b.

In step S20, the solid-state image pickup element 2 is switched to the read-out mode to read out the image data, and the memory controller 8 executes the second operation A2 to store the readout image data in the memory 7.

In step S21, whether the getting of the black-subtracted data is completed is checked. If NO in step S21, the processing from step S19 to step S22 is repeated. That is, steps S19 to S22 are repeated m times, i.e., the same number of repetition times as steps S15 to S18, thereby obtaining black-subtracted data (m). This calculated black-subtracted data (m) is added to the addition result in the second area 7*b*. Finally, addition data K3

$$K3 = \sum_{i=1}^{m} \{\text{image data}(i) - \text{black image data}(0)\} + \sum_{i=1}^{m} \{\text{black image data}(0) - \text{black image data}(i)\} \quad (3)$$

is obtained.

In step S23, image processing is executed on the basis of the addition data K3, and the whole processing is completed.

In this second embodiment as described above, image processing is performed on the basis of the sum K3 obtained by adding the sum of the subtraction data (m) and the sum of the black image data (m). Accordingly, it is possible to avoid random noise contained in the image data (0) from being added as fixed pattern noise. Consequently, high-quality image data having a dynamic range not narrowed by a dark current and also having a high S/N ratio can be obtained. In addition, the shutter 3 need only be opened/closed a fewer number of times than in the above first embodiment. This can reduce the load required for shutter driving.

In this embodiment, both the black-subtracted data and the subtraction data are acquired m times. However, the expected technological advantages of the present invention can be well achieved even when the black-subtracted data is acquired (m−1) times. Also, although the S/N ratio more or less deteriorates, the expected technological advantages can be well accomplished depending on the intended use even when the black-subtracted data is acquired p times (p<m).

Figure 12:
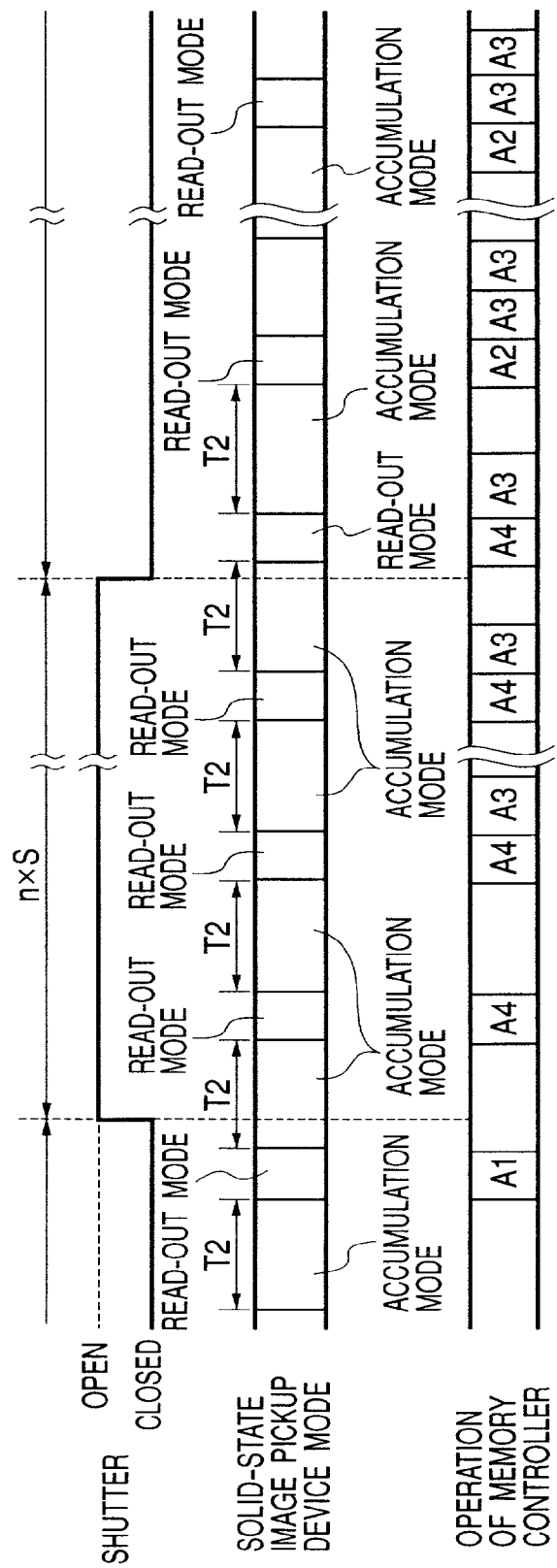
FIG. 12 is a timing chart showing the control timings of the third embodiment.

FIG. 12 is a timing chart showing the third embodiment of the image data processing method according to the present invention. In this third embodiment, the number of times of black-subtracted data acquisition executed after a sum K2 of subtraction data (m) is obtained and the shutter is closed, is reduced.

That is, in this third embodiment, the operation of shutter closing→shutter opening is executed to calculate addition data K2 of subtraction data (m) as in the second embodiment (steps S11 to S18). After that, the operation mode is set to the accumulation mode to accumulate image data with the shutter 3 closed. The memory controller 8 executes a second operation A2 to acquire black-subtracted data (1) and then executes a third operation A3 twice in succession. That is, black-subtracted data is successively added twice, and the sum is added to the sum in the second area 7*b*, thereby halving the number of times of black-subtracted data acquisition executed after the shutter is closed.

As described above, the number of times of the black-subtracted data acquisition is reduced to (m/2) by successively adding the black-subtracted data twice. Consequently, high-quality image data having a dynamic range not narrowed by a dark current and also having a high S/N ratio can be obtained as in the first and second embodiments described above. In addition, the operating time after the shutter is closed can be reduced by half.

In this third embodiment, the number of times of the black-subtracted data acquisition is set to (m/2). However, this number of times can also be (m/q) (1<q<m). That is, it is also favorable to vary the value of q in accordance with the intended use, although the S/N ratio often deteriorates when q increases because the fixed noise pattern removal ratio lowers.

Figure 13:
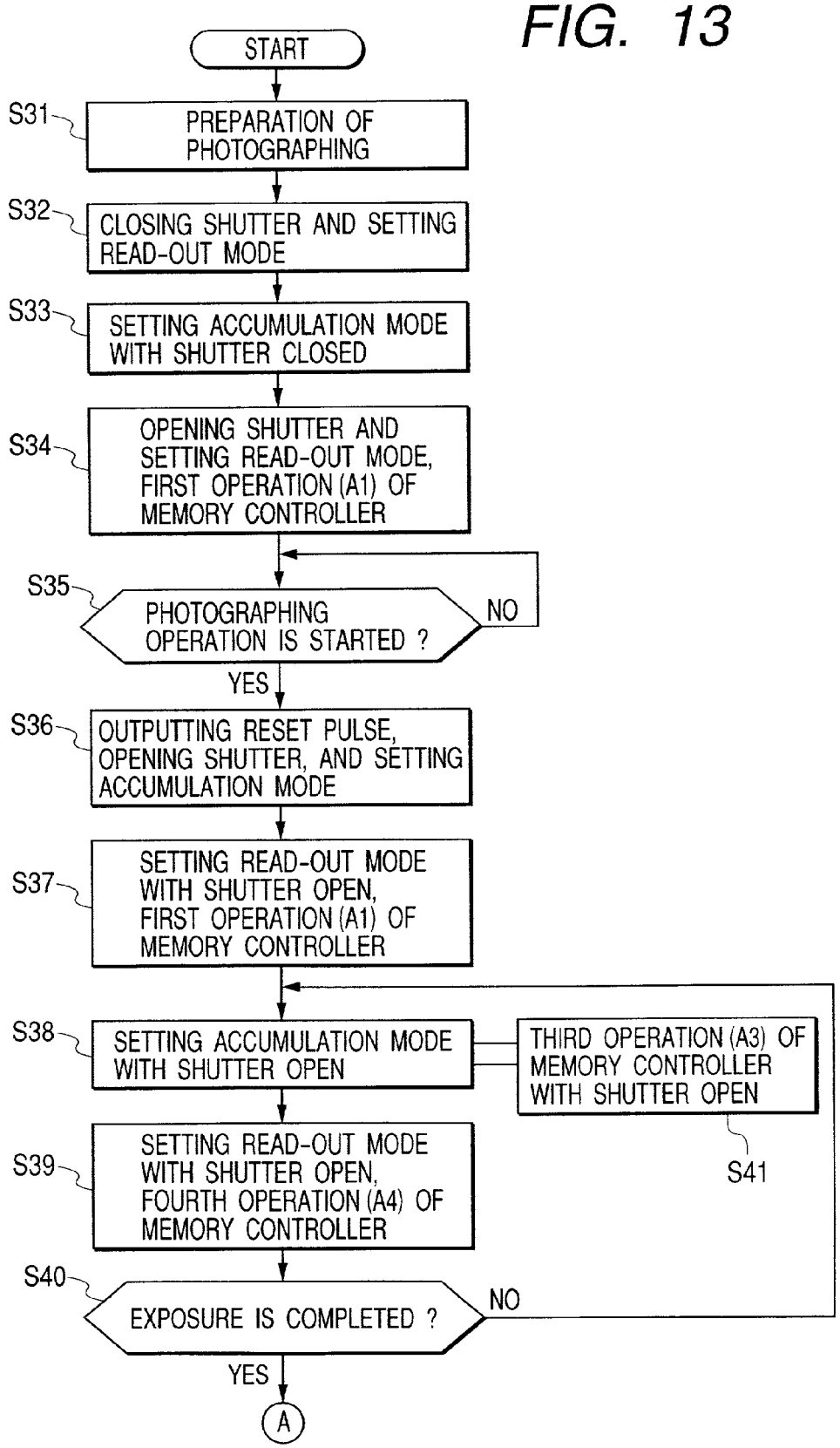
FIG. 13 is a flow chart (1/2) showing the fourth embodiment of the image input apparatus control method according to the present invention.
Figure 14:
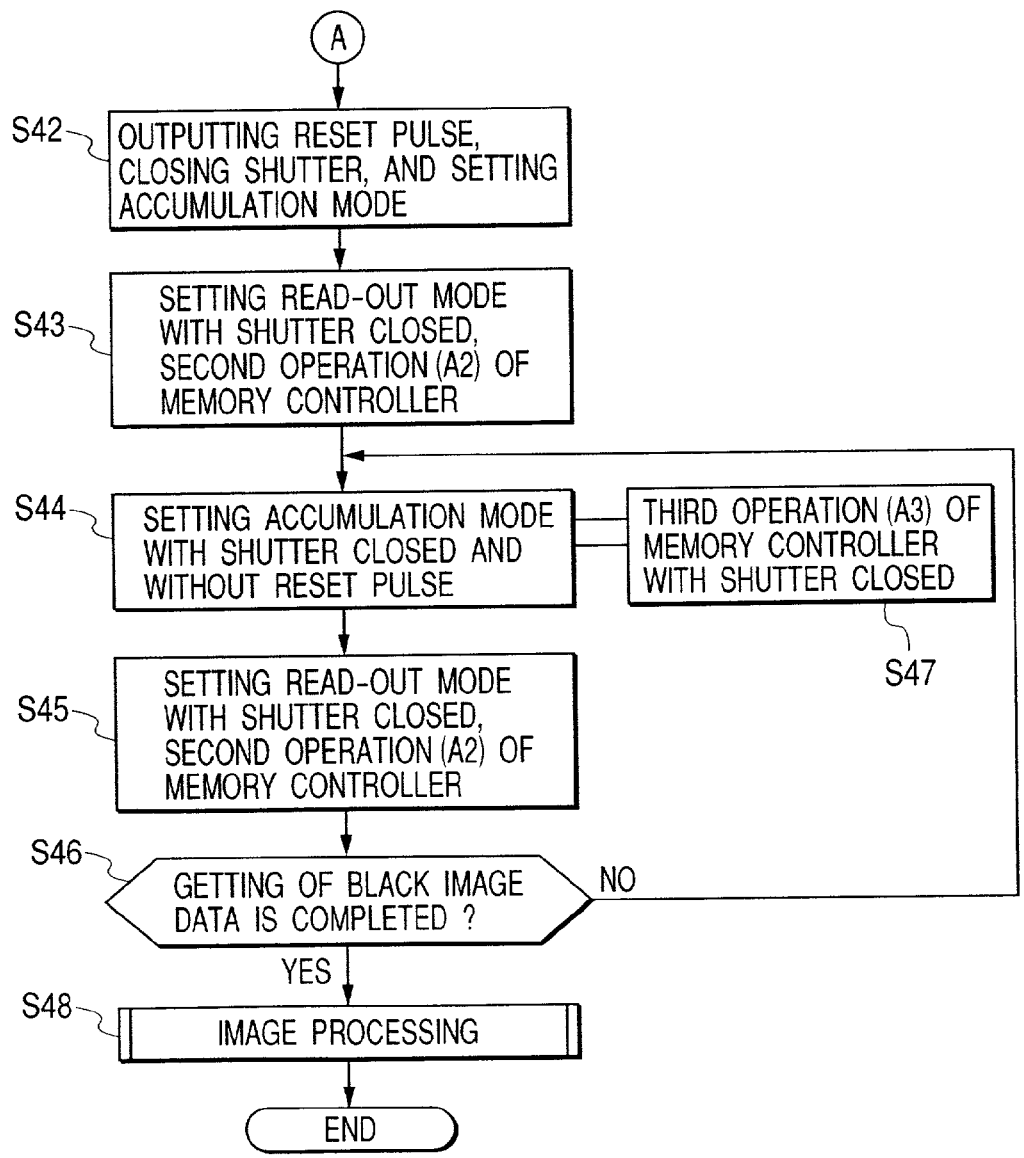
FIG. 14 is a flow chart (2/2) showing the fourth embodiment of the image input apparatus control method according to the present invention.
Figure 15:
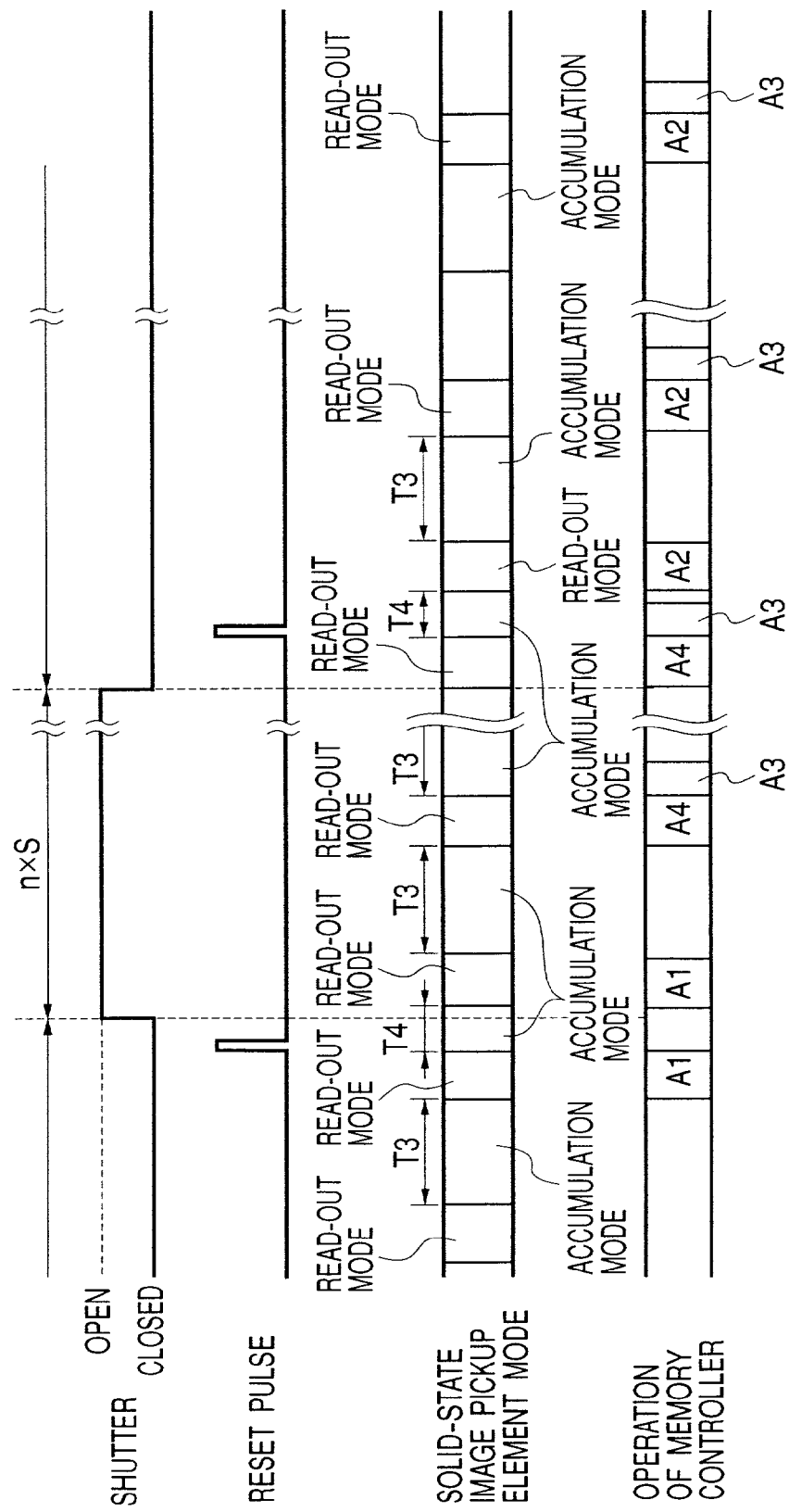
FIG. 15 is a timing chart showing the control timings of the fourth embodiment.

FIGS. 13 and 14 are flow charts showing the fourth embodiment of the image data processing method according to the present invention. FIG. 15 is a timing chart showing control timings when the programs shown in FIGS. 13 and 14 are executed.

In this fourth embodiment, an X-Y address type CMOS-sensor in which a pixel region and peripheral circuits such as shift registers are formed on the same semiconductor chip by a CMOS process is used as a solid-state image pickup element. Photoelectrical charge accumulated in all pixels can be removed by an all-pixel reset pulse supplied from the image pickup element driving circuit 5.

As described above, in this CMOS sensor the photoelectrical charge accumulated in all pixels can be removed by the all-pixel reset pulse supplied from the image pickup element driving circuit 5. Also, even in the read-out mode each pixel accumulates photoelectrical charge except for a timing at which data is read out from the pixel onto a horizontal transfer line. That is, when a CMOS is used, the profile of a dark current contained in image information accumulated after pixels are reset by the all-pixel reset pulse differs from the profile of a dark current contained in image information accumulated after image information is read out in the read-out mode. Therefore, the expected technological advantages of the present invention can be achieved by executing the control procedures as shown in FIGS. 13 to 15.

In this fourth embodiment, when a photographing preparation start instruction is output, a preparation of photographing is performed in step S31. In step S32, as shown in FIG. 15, the solid-state image pickup element 2 is set in the read-out mode to read out image data with the shutter 3 closed. Note that the readout image data is not stored in the memory 7.

In step S33, the operation mode of the solid-state image pickup element 2 is set to the accumulation mode to accumulate image data. In step S34, the solid-state image pickup element 2 is switched to the read-out mode to read out the image data, and the memory controller 8 stores the readout image data (black image data (0)) in the first area 7*a* of the memory 7 (first operation A1).

In step S35, a photographing operation start command is waited for. When this photographing operation start command is output, the flow advances to step S36 to output a reset pulse and set the solid-state image pickup element 2 to the accumulation mode. In addition, the shutter 3 is opened, and the solid-state image pickup element 2 is kept in the accumulation mode for a predetermined time T4. After that, the flow advances to step S37. In step S37, the operation mode is switched to the read-out mode to read out the image data with the shutter 3 open, and the memory controller 8 executes the first operation A1 to store the image data obtained during the predetermined time T4 into the second area 7*b* of the memory 7.

The flow then advances to step S38 to set the solid-state image pickup element 2 to the accumulation mode for a predetermined time T3. In step S39, the solid-state image pickup element 2 is switched to the read-out mode to read out the image data, and the memory controller 8 executes the fourth operation A4 to subtract the black image data (0) obtained in step S34 from the image data (image data (1)) from the A/D converter 6, thereby acquiring subtraction data (1) and storing this subtraction data (1) in the third area 7*c*.

If it is determined in step S40 that exposure is not completed because the shutter 3 is kept open, the flow returns to step S38 to set the solid-state image pickup element 2 to the accumulation mode for a predetermined time T3. Also, the memory controller 8 executes the third operation A3 (step S41).

That is, the image data (0) obtained in step S34 and the subtraction data (1) obtained in step S39 are added, and the addition data is stored in the second area 7b of the memory 7.

Subsequently, step S39 is executed to acquire subtraction data (2), and addition data is acquired in step S41 until a predetermined time (n×S) elapses. This addition data is stored in the second area 7b of the memory 7.

When the predetermined time (n×S) has elapsed, it is determined that exposure is completed after the processing from step S38 to step S41 is performed m times, and the flow advances to step S42 in FIG. 14. In step S42, the shutter 3 is closed, a reset pulse is output, and the accumulation mode is set for the predetermined time T4. The flow then advances to step S43 to switch the operation mode of the solid-state image pickup element 2 to the read-out mode, and the memory controller 8 executes the second operation A2. That is, the difference between the addition data obtained in step S41 and the image data (black image data) from the A/D converter 6 is stored in the form of addition data—output from A/D converter 6.

After that, the flow advances to step S44 to set the accumulation mode. In step S45, the read-out mode is set to read out the image data, and the memory controller 8 executes the second operation A2 to store the difference as black-subtracted data, in the form of black image data (0)—output (black image data) from A/D converter, into the fifth area 7e of the memory 7.

Subsequently, whether the getting of the black image data is completed is checked (step S46). If NO in step S46, the flow returns to step S44 to set the solid-state image pickup element 2 in the accumulation mode for the time T3. Also, the memory controller 8 executes the third operation A3 (step S47), thereby adding the addition data stored in the second area 7d and the black-subtracted data (1) stored in the fifth area 7e and storing the obtained addition data in the second area 7b.

Steps S44 to S47 are thus executed m times to acquire addition data, image processing is performed by using this addition data as final image data (step S47), and the whole processing is completed.

As described above, the operation immediately after the reset pulse is generated is executed in a different way from those executed in other cases. In this manner, the same functions and effects as in the first to third embodiments can be accomplished even when a CMOSsensor is used.

Figure 16:
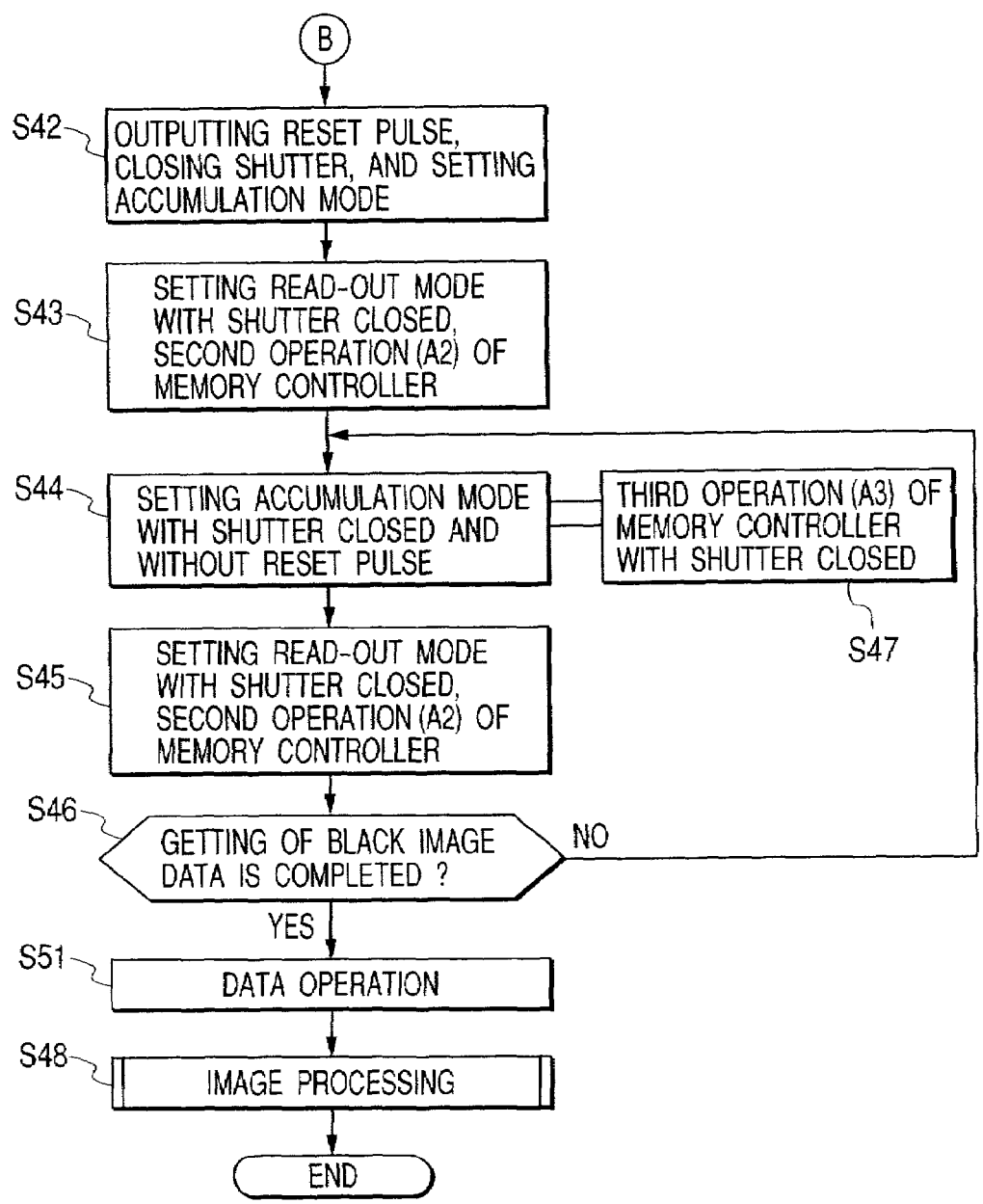
FIG. 16 is a flow chart showing the main part of the fifth embodiment of the image input apparatus control method according to the present invention.
Figure 17:
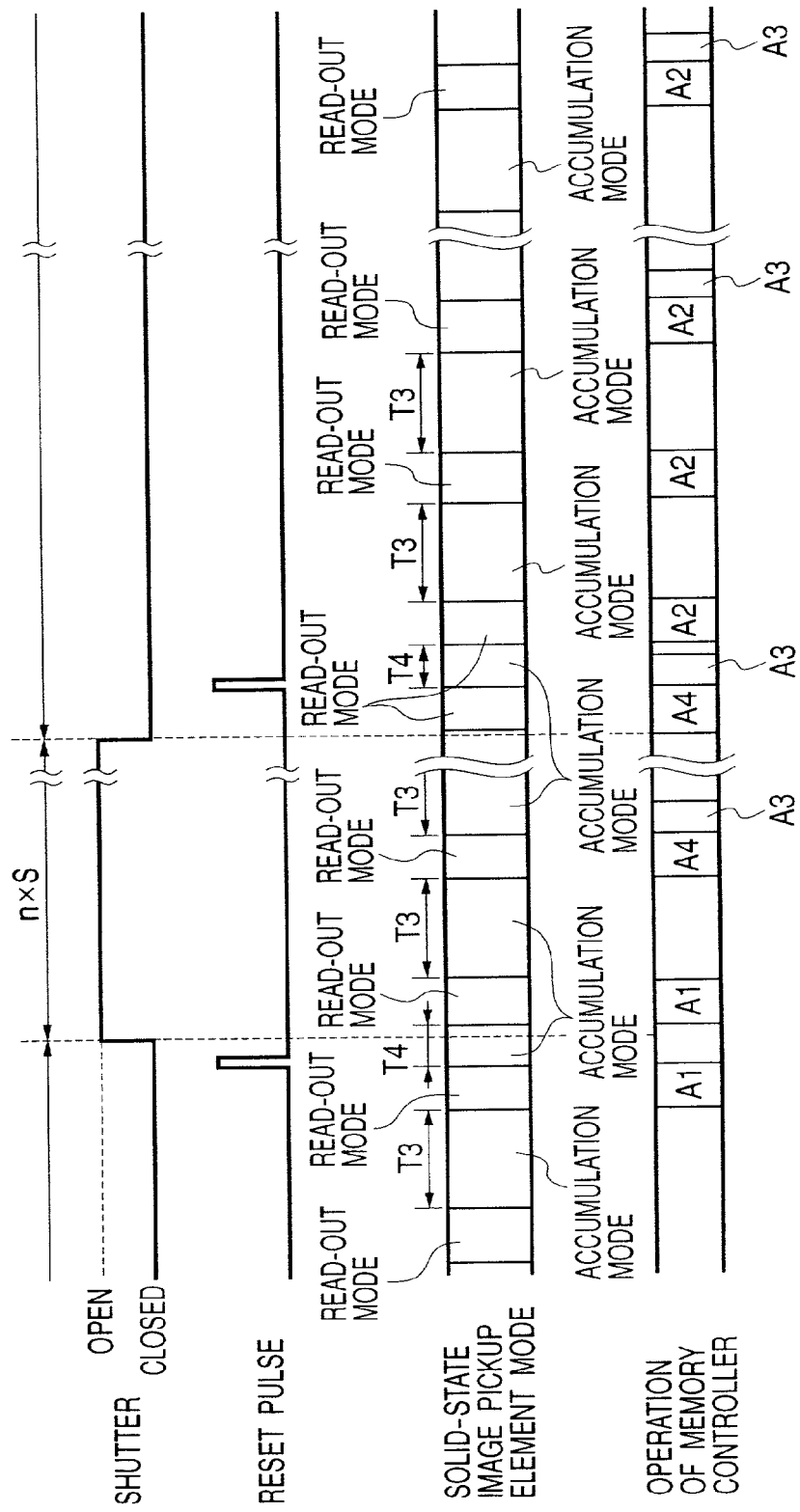
FIG. 17 is a timing chart showing the control timings of the fifth embodiment.

FIG. 16 is a main part flow chart showing the fifth embodiment of the image data processing method according to the present invention. FIG. 17 is a timing chart showing control timings in this fifth embodiment.

In this fifth embodiment, a CMOSsensor is used as the solid-state image pickup element 2 as in the fourth embodiment described above. Additionally, the number of times of black image data acquisition executed after the shutter is closed is increased, normalized, and subtracted from addition data.

That is, as shown in FIG. 17, the sum of subtraction data is calculated with the shutter 3 open and stored in the second area 7b, similar to the fourth embodiment.

When exposure is completed, in step S42 of FIG. 16 the shutter 3 is closed to output a reset pulse, thereby setting the accumulation mode for a predetermined time T4. After that, the flow advances to step S43 to switch the operation mode of the solid-state image pickup element 2 to the read-out mode, and the memory controller 8 executes the second operation A2. That is, the difference between the addition data obtained in step S41 and image data (black image data) from the A/D converter 6 is stored in the form of addition data—output from A/D converter, into the second area 7b.

The flow then advances to step S44 to set the accumulation mode. In step S45, the read-out mode is set to read out the image data, and the memory controller 8 executes the second operation, thereby storing the difference as black-subtracted data (1), in the form of black image data (0)—output (black image data) from A/D converter, into the fourth area 7d of the memory 7.

Furthermore, steps S44 and S45 are again repeated. That is, after the accumulation mode is set, in step S45 the read-out mode is set to read out the image data, and the memory controller 8 executes the operation A2 to store black-subtracted data (2) in the fifth area 7e of the memory 7.

Subsequently, whether the getting of the black image data is completed is checked. If the answer is NO, the flow again returns to step S44 to set the solid-state image pickup element 2 to the accumulation mode for the time T3. Also, the memory controller 8 executes the third operation A3 (step S47) to add the addition data stored up to this point in the fourth area 7d and the black-subtracted data (1), and stores the result as addition data in the fourth area 7d.

In addition, steps S44 to S47 are repeated a times to calculate addition data. In step S51, the addition data is normalized by multiplying by (m/α) on the memory 7 and subtracted m times from the addition data stored in the second area 7b. In step S48, image processing is performed on the basis of this operation result, and the whole processing is completed.

Note that α can also fall within the range α>m. With this operation, high-quality image data having a dynamic range not narrowed by a dark current and also having a high S/N ratio can be obtained.

Figure 18:
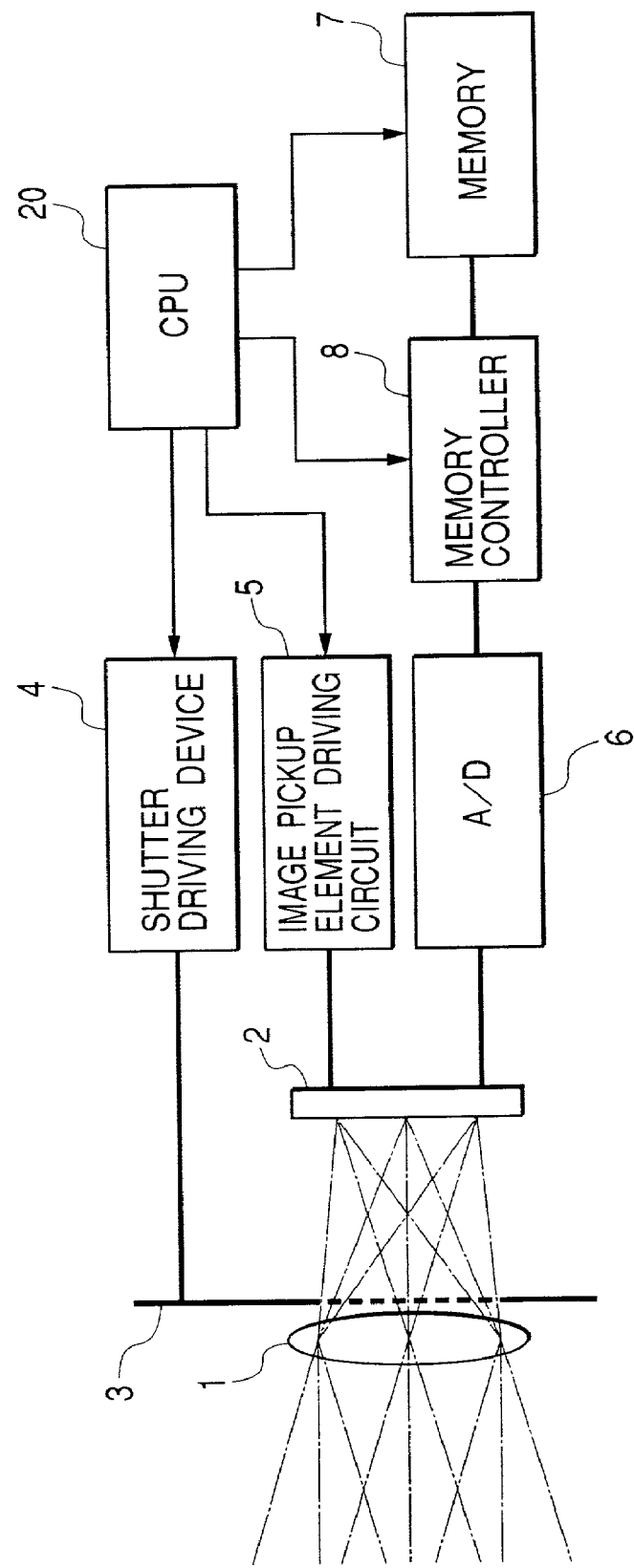
FIG. 18 is a block diagram showing another embodiment of the image input apparatus according to the present invention.

The present invention is not limited to the above embodiments. In the above embodiments, a so-called focal-plane shutter type image input apparatus in which the shutter 3 is positioned in the vicinity of the focal plane of the lens 2 is explained. However, as shown in FIG. 18, the present invention is similarly applicable to a lens shutter type image input apparatus in which the shutter 3 is positioned immediately after the lens 2.

In the first to fifth embodiments as described in detail above, even when the exposure time is long it is possible to remove fixed pattern noise and obtain a high-quality image whose dynamic range is not narrowed.

Figure 19:
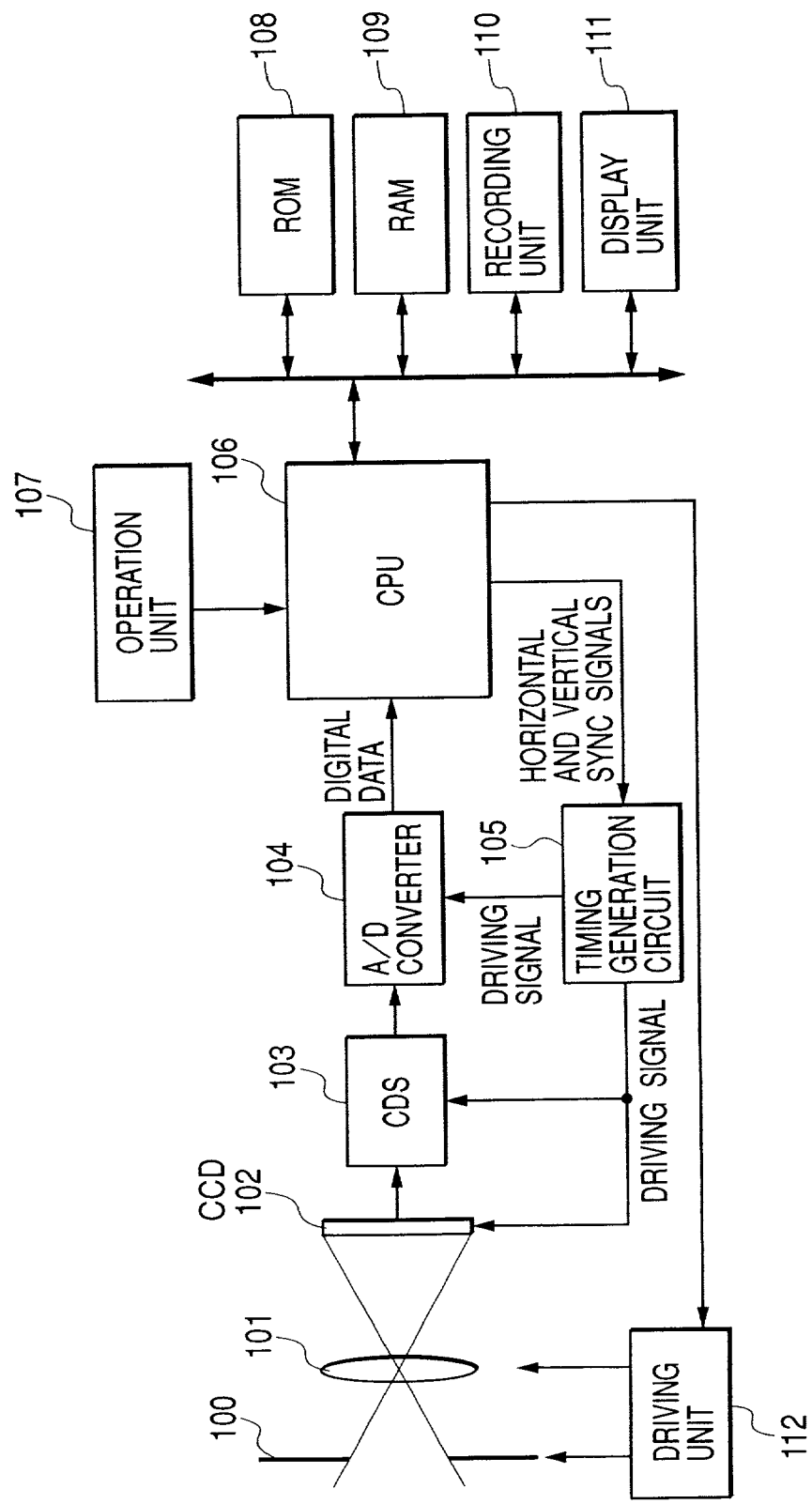
FIG. 19 is a block diagram showing the configuration of an image pickup apparatus according to the sixth embodiment.

FIG. 19 is a block diagram showing the arrangement of a photographing apparatus according to the sixth embodiment. This photographing apparatus comprises a lens 101, an iris/shutter 100, a driving unit 112, an inter-line CCD 102, a correlation double sampling circuit (CDS) 103, an A/D converter 104, a timing generator (TG) 105, a CPU 106, a ROM 108, a RAM 109, a recording unit 110, a display unit 111, and an operation unit 107. Of these components, the CDS 103 and the A/D converter 104 are analog units.

The driving unit 112 drives the lens 101 and the iris/shutter 100. The TG 105 generates a timing signal for driving the image pickup element (CCD) 102. The recording unit 110 records a video signal. The display unit 111 displays a photographed image.

The operation unit 107 has a release button (not shown), switches for setting an aperture value, sensitivity, and photographing time, and a main switch. The release button is a two-step button by which switches S1 and S2 are turned on; the switch S2 is always turned on only after ON of the switch S1.

In this photographing apparatus, a photographing sequence is switched between two modes, i.e., a normal exposure mode and a long-time exposure mode, in accordance with the exposure time. This switching is done in accordance with the exposure time set by the operation unit 107 or the exposure time calculated before photographing.

Figure 20:
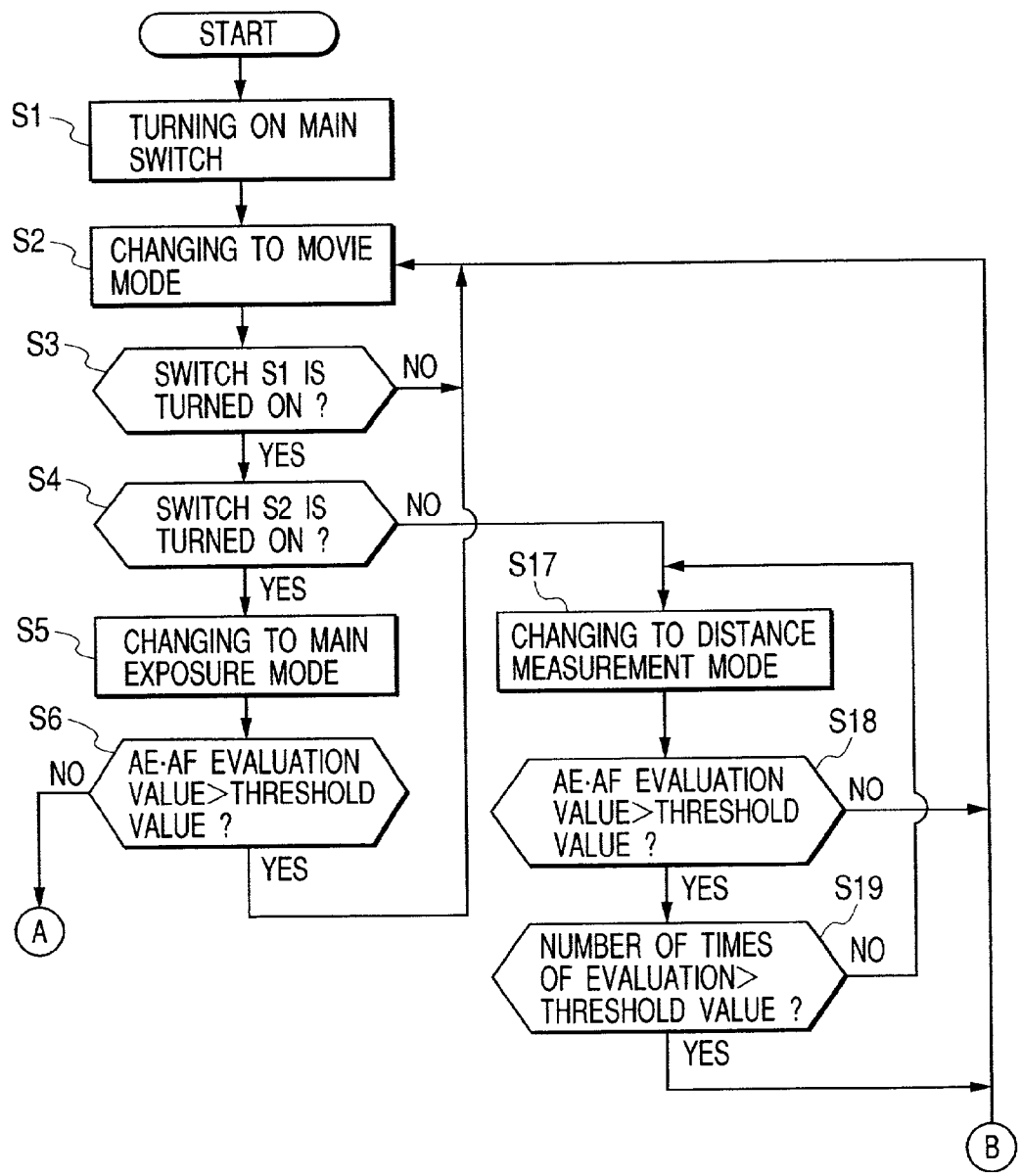
FIG. 20 is a flow chart showing the procedure of photographing.
Figure 21:
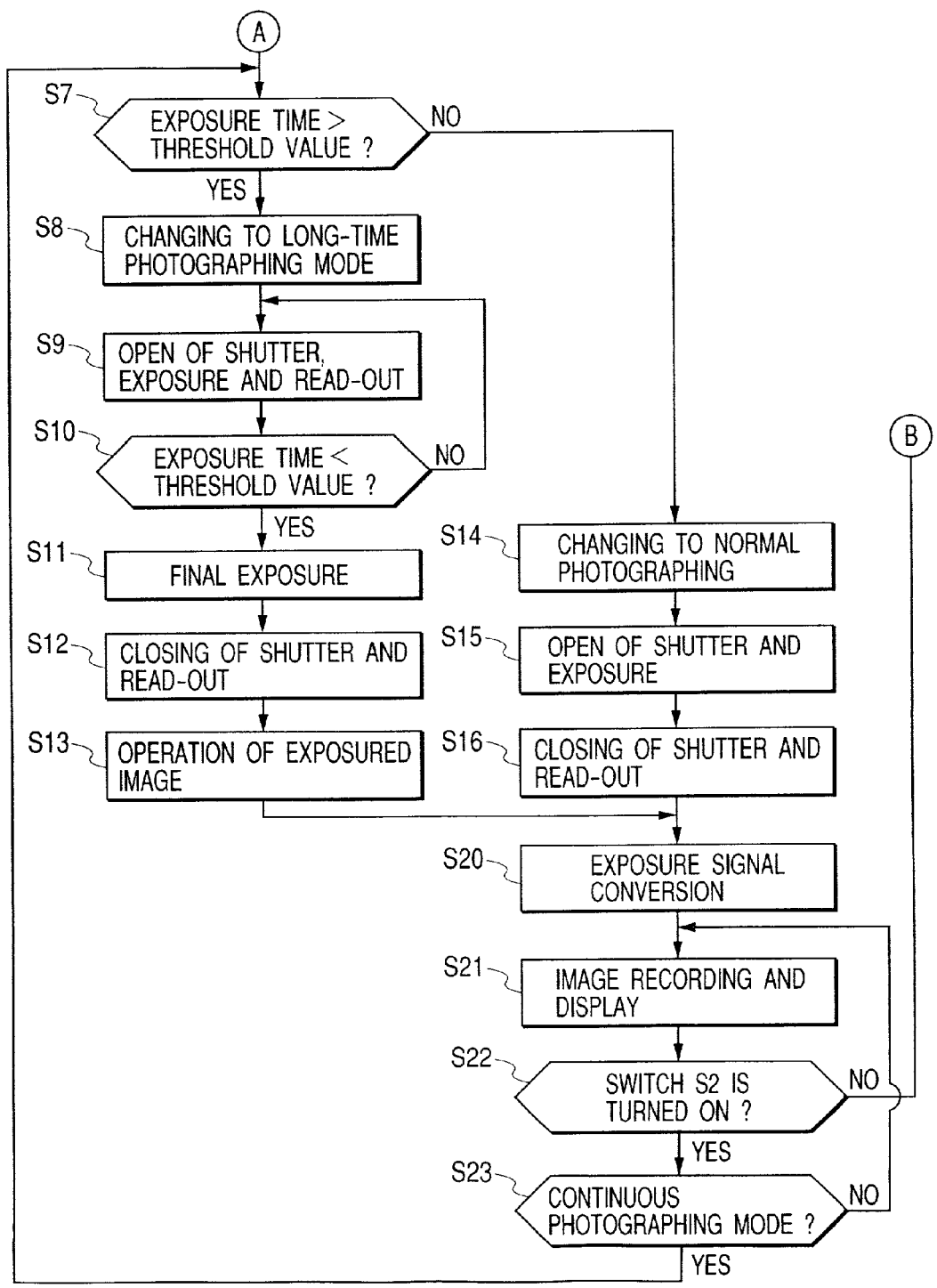
FIG. 21 is a flow chart showing the procedure of photographing continued from FIG. 20.

FIGS. 20 and 21 are flow charts showing the procedure of photographing. This process program is stored in the ROM 108 and executed by the CPU 106. First, photographing in normal exposure mode will be explained. When the main switch is turned on on the operation unit 107 (step S1), the photographing apparatus proceeds to a movie mode in which a motion image is displayed on the display unit 111 (step S2). In this movie mode, the CPU 106 performs movie operation settings to the TG 105, the CDS 103, and the A/D converter 104, and starts outputting horizontal and vertical sync signals to the TG 105.

When the sync signals matching the movie image period are supplied to the TG 105, exposure and read-out of the CCD 102 are performed at an arbitrary period. A signal from the CCD 102 is converted into a digital signal via the CDS 103 and the A/D converter 104. This digital signal is supplied to the CPU 106 and temporarily stored in the RAM 109. After a signal of one period is recorded, the CPU 106 performs arbitrary signal conversion for the video signal in the RAM 109, thereby converting the signal into a display signal. After the conversion, the CPU 106 sequentially supplies the video signal to the display unit 111 to display it as a movie image.

In this state, the CPU 106 checks whether the switches S1 are S2 are depressed (steps S3 and S4). If the switch S1 is not depressed, the flow returns to the processing in step S2. If the switch S1 is turned on and the switch S2 is not depressed, the photographing apparatus passes on to a distance measurement mode (step S17). If the switches S1 and S2 are simultaneously turned on, the photographing apparatus immediately passes on to an exposure mode of main photographing without proceeding to the distance measurement mode (step S5).

In the distance measurement mode, the CPU 106 performs settings for still image photographing for the individual components, and supplies a still image sync signal to the TG 105. The TG 105 supplies a still image driving signal to the CCD 102 to perform exposure and read-out of a still video signal. A digital video signal read out via the CDS 103 and the A/D converter 104 is recorded in the RAM 109. The CPU 106 performs arithmetic processing for the video signal recorded in the RAM 109, calculates an aperture value, and supplies a control value to the driving unit 112 to set correct exposure. After that, the CPU 106 proceeds to exposure for calculating an AF control value.

The CPU 106 sequentially moves the lens 101 to several set positions and photographs at each position. After recording a plurality of video signals obtained at different lens positions into the RAM 109, the CPU 106 operates to obtain the AF control value. The CPU 106 checks whether the control value is equal to or smaller than a given threshold value (step S18). If the control value is equal to or smaller than the given threshold value, the CPU 106 terminates the AE•AF adjustment. If the control value is larger than the threshold value, the CPU 106 sets the current number of times of evaluation and checks whether the set number of times is equal to or smaller than a given number of times (threshold value) (step S19). If the set number of times is equal to or smaller than the given number of times, the CPU 106 supplies the calculated control value to the driving unit 112 and again executes the AF operation. After that, the flow returns to step S17 to perform the adjustment an arbitrary number of times until an appropriate evaluation value is obtained. If the switch S1 is kept depressed even after the adjustment is completed, the CPU 106 holds the current AE•AF condition. After the adjustment is completed or after the adjustment is performed the arbitrary number of times, the CPU 106 terminates the AE•AF operation and returns to step S2 to proceed to the movie mode. In this state, a correctly exposed, in-focus video signal is displayed.

On the other hand, if it is determined in step S4 that the switch S2 is turned on, the photographing apparatus proceeds to the main photographing (exposure) mode as described above. First, the CPU 106 passes on to the distance measurement mode, repeats the AE•AF operation, performs adjustment so that an image having appropriate image quality is obtained, and also calculates the exposure time of main exposure (step S6).

The CPU 106 then checks whether the exposure time is larger than a threshold value (step S7). If the exposure time is equal to or smaller than the threshold value, the CPU 106 proceeds to the normal photographing (exposure) mode after the AE•AF adjustment (step S14).

Figure 22:
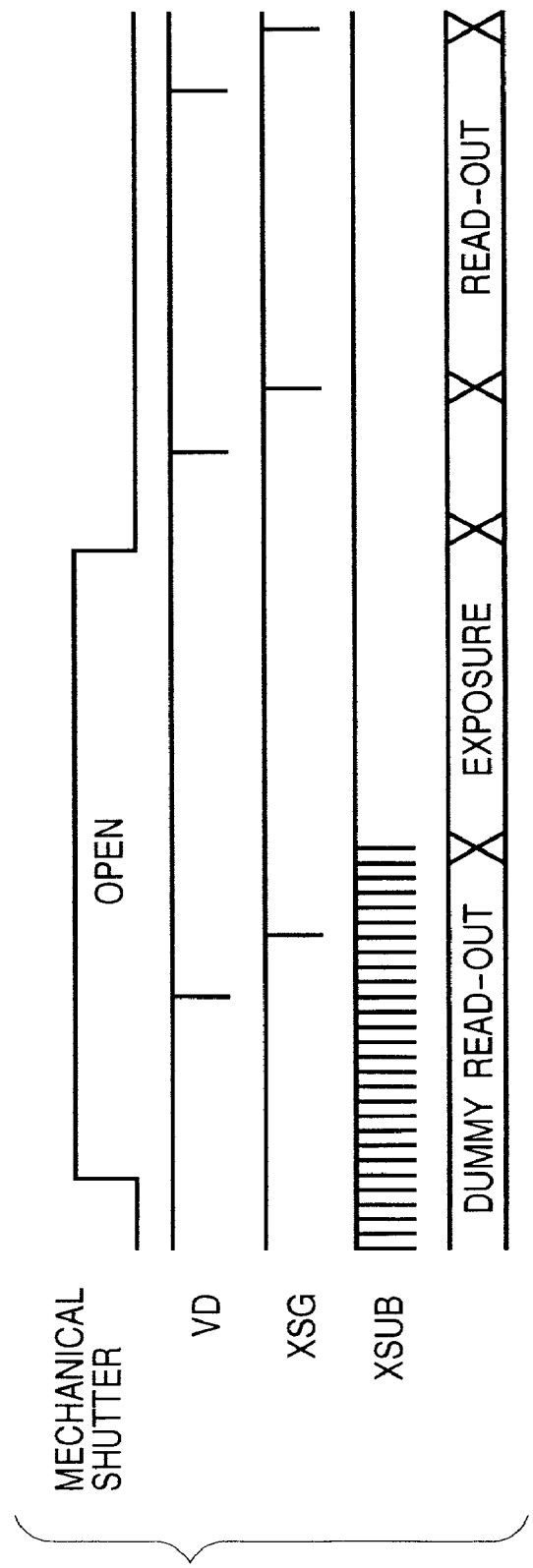
FIG. 22 is a timing chart showing changes in CCD driving signals in normal exposure mode.

FIG. 22 is a timing chart showing changes in CCD driving signals in normal exposure mode. First, the CPU 106 starts outputting a sync signal for main exposure and begins main exposure read-out of the CCD 102. After an arbitrary time for stabilizing the operations of the individual components has elapsed, the CPU 106 opens a mechanical shutter. In this state, the CCD 102 is set in the state of discharge of electric charge by an electronic shutter.

The CPU 106 stops the electronic shutter at a timing based on the previously calculated exposure time, and starts main exposure (step S15). After the calculated exposure time has elapsed, the CPU 106 closes the mechanical shutter and terminates the main exposure.

The CPU 106 starts reading out the exposed video signal from an arbitrary timing of a next sync signal XSG (step S16). Similar to the movie mode, in this main exposure mode the signal is converted into digital data via the CDS 103 and the A/D converter 104, and this digital data is stored in a given area of the RAM 109 by the CPU 106.

The CPU 106 performs signal conversion, which matches the image format to be recorded, for the data recorded in the RAM 109 (step S20), and again records the converted data in another area of the RAM 109. The video signal converted into the given image format is supplied to the recording unit 110 and recorded on a recording medium.

Also, the CPU 106 performs signal conversion similar to that in movie mode on the data before being converted, and supplies the converted signal to the display unit 111 to display the photographed image (step S21). At this point, the CPU 106 checks whether the switch S2 is kept depressed (step S22). If the switch S2 is kept depressed, the CPU 106 checks whether a continuous photographing mode is set (step S23).

If the mode of photographing is a discontinuous photographing mode, the flow returns to the processing in step S21 to keep displaying the photographed image on the display unit 111 until the switch S2 is released. If it is determined in step S23 that the photographing mode is a continuous photographing mode, the flow returns to the processing in step S7 to again execute photographing. In this case, the photographing apparatus does not proceed to the distance measurement mode for performing AE•AF adjustment. That is, the main exposure mode is continued by using the same parameters as in photographing of the first image, and the sequence of signal read-out, video signal conversion, and recording is repeated. If it is determined in step S22 that the switch S2 is released, the CPU 106 exits the main exposure mode and again proceeds to the movie mode in step S2 to perform arbitrary settings and display the movie on the display unit 111.

The long-time exposure mode will be described next. If in step S7 the exposure time set by the operation unit 107 or the exposure time measured in the distance measurement mode is longer than the preset exposure time, the CPU 106 starts the operation of the long-time exposure mode (step S8).

Figure 23:
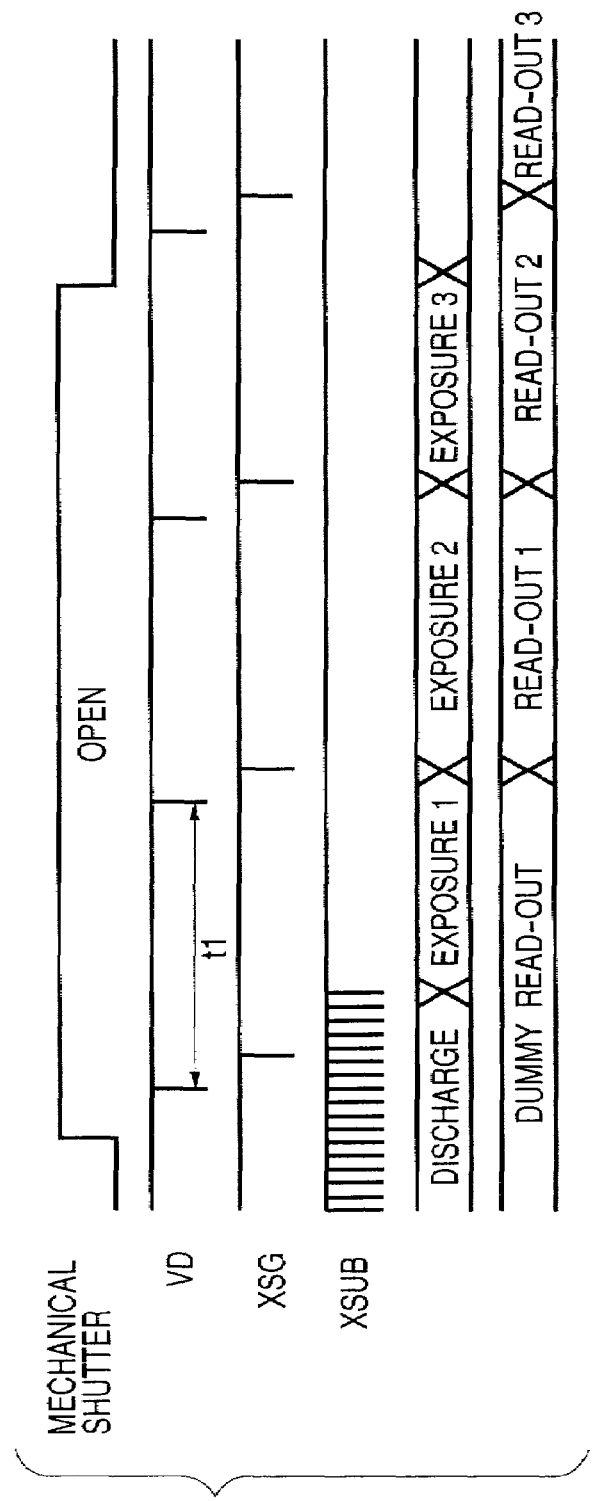
FIG. 23 is a timing chart showing changes in CCD driving signals in long-time exposure mode.

In this long-time exposure mode, exposure and read-out are performed by dividing the exposure time into predetermined time periods, and a plurality of output video signals are added to finally obtain one video signal. FIG. 23 is a timing chart showing changes in CCD driving signals in the long-time exposure mode. Referring to FIG. 23, t1 is a unit time of one exposure, and exposure of this unit time t1 is repeated a plurality of times to acquire a plurality of video signals. These acquired video signals are added on the memory to obtain a final video signal.

Figure 24:
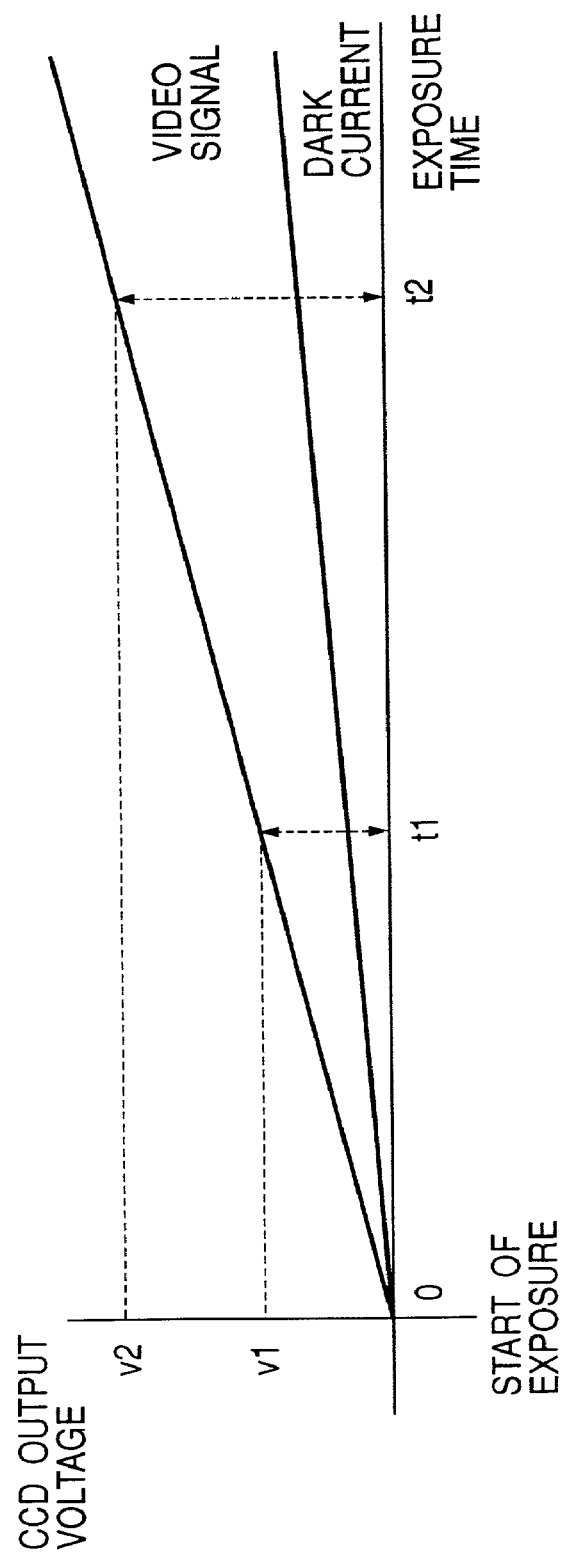
FIG. 24 is a graph showing changes in the CCD output voltage with respect to the exposure time.

FIG. 24 is a graph showing changes in the CCD output voltage as a function of the exposure time. In long-time photographing, a signal obtained by superposing a dark current component on a video signal is output from the CCD 102. By setting the value of this dark current increase during the unit time t1 as a maximum value, a video signal can be obtained without widening the input range of the A/D converter 6 even in long-time photographing longer than the unit time t1. This makes it possible to widen the dynamic range and obtain a video signal having a high S/N ratio. The operation in long-time exposure mode will be described below with reference to the flow charts in FIGS. 20 and 21.

First, assume that the switch S1 is depressed in movie mode and an exposure time longer than the exposure unit time t1 is set from the distance measurement result. The CPU 106 adjusts the aperture value to an arbitrary value on the basis of AE data and passes on to the movie mode. In long-time movie mode, the exposure time is a plurality of times as long as the normal exposure unit time t1, so the display frame rate lowers. However, an image can also be displayed without any addition process by so setting the operation unit 107.

Figure 25:
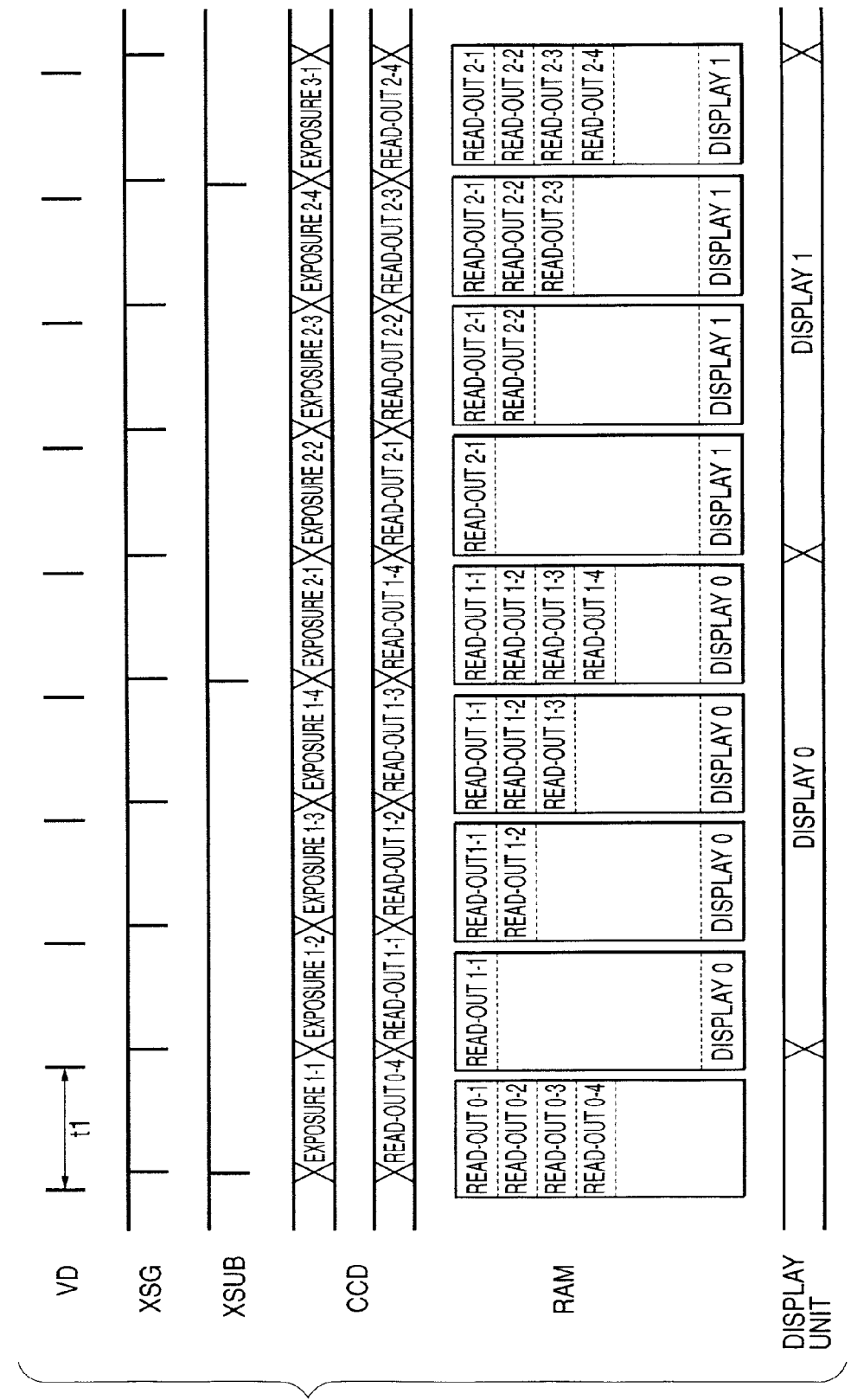
FIG. 25 is a timing chart showing an image pickup operation when the exposure time is four times a normal exposure unit time t1.
Figure 26:
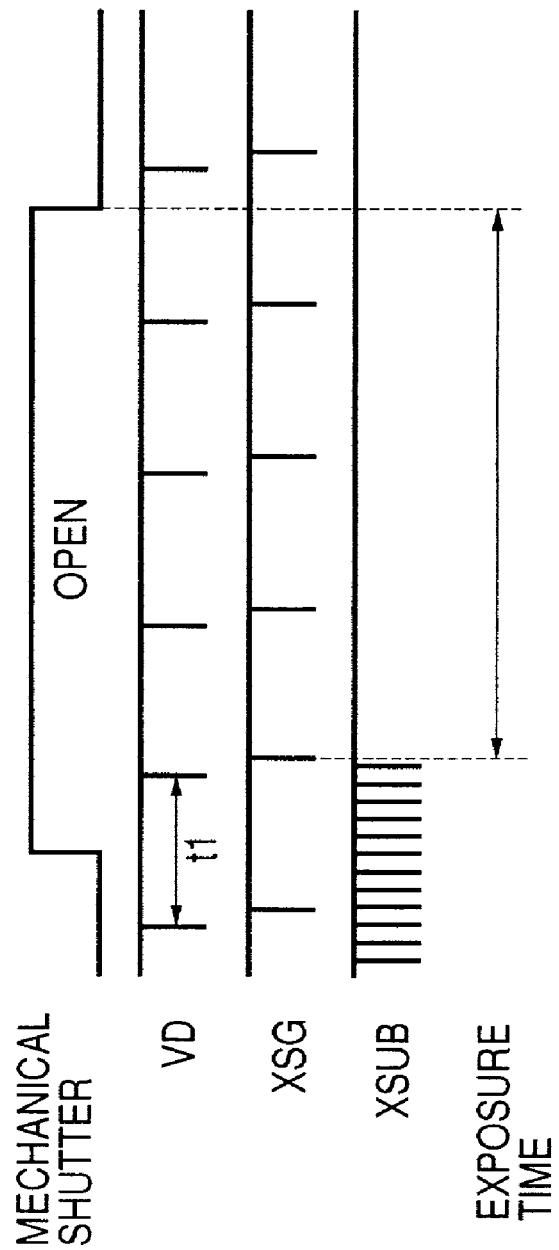
FIG. 26 is a timing chart showing changes in CCD driving signals in the case of FIG. 25.

In this embodiment, an operation when the exposure time is four times the unit time t1 will be explained. FIG. 25 is a timing chart showing an image pickup operation when the exposure time is four times the normal exposure unit time t1. FIG. 26 is a timing chart showing changes in CCD driving signals in the case of FIG. 25. First, the CPU 106 sets the TG 105 and the like in the movie mode. That is, the CPU 106 performs this setting such that the TG 105 outputs an electronic shutter pulse XSUB to the CCD (sensor) once in a 4V (vertical sync) period, and starts driving the sensor.

A signal corresponding to ¼ of the correct exposure time is read out from the sensor at every 1V period, supplied as digital data to the CPU 106 via the CDS 103 and the A/D converter 6, and recorded in an arbitrary area of the RAM 109.

In the CCD 102, electric charge discharge using the electronic shutter is performed once in a 4V period. Accordingly, a video signal of a 4V period during which no electronic shutter pulse is applied is a continuously exposed video signal.

For the video signal recorded on the RAM 109, the CPU 106 first sequentially corrects defective pixels of the CCD 102. When video signals of four pictures are recorded, the CPU 106 adds these four video signals to convert them into one video signal and further performs signal conversion for display, thereby recording the video signal in another area of the RAM 109. This display signal is held in the RAM 109 for a 4V period before the next display signal is formed, and thus the same image is displayed.

If in movie mode it is determined in step S4 that the switch S2 is depressed, the CPU 106 proceeds to the main exposure mode (step S5), and performs an AE•AF operation to check the exposure time and the like. To decrease any shutter time lag, this AE•AF operation is performed using a signal of a 1V (vertical sync) period. As an aperture value and the like, control values corresponding to a correct exposure time are calculated from the signal of a 1V period. After completing this AE•AF operation, the CPU 106 checks whether the AE•AF evaluation value is larger than the threshold value (step S6). If the AE•AF evaluation value is larger than the threshold value, the flow returns to the processing in step S2. If the AE•AF evaluation value is equal to or smaller than the threshold value, the CPU 106 checks whether the exposure time is longer than the threshold value (step S7). If the exposure time is longer than the threshold value, the CPU 106 passes on to the long-time photographing mode (step S8).

In main photographing mode, similar to normal photographing, the CPU 106 starts outputting a sync signal for main exposure and starts main exposure read-out of the CCD 102. After an arbitrary time for stabilizing the operations of the individual components has elapsed, the CPU 106 opens the mechanical shutter, closes the electronic shutter at a timing based on the previously calculated exposure time, and begins main exposure (step S9).

During this exposure time, no electronic shutter pulse is output and, when a read-out pulse signal XSG is supplied, signals obtained by exposure up to this point are sequentially read out. As in movie mode, the readout signals are digitized via the CDS 103 and the A/D converter 104 and recorded in a given area of the RAM 109. The CPU 106 sequentially performs defect correction for the recorded video signals. The CPU 106 calculates the remaining exposure time whenever recording of a video signal of a 1V period is completed, and compares the calculated remaining exposure time with a threshold value equal to the maximum exposure time of 1V (step S10). If the remaining exposure time is equal to or longer than the threshold value, the flow returns to the processing in step S9 to again execute exposure and read-out.

When the remaining exposure time becomes shorter than the threshold value, the CPU 106 proceeds to the final exposure stage (step S11). When the arbitrary exposure time has elapsed, the CPU 106 closes the mechanical shutter, terminates the main exposure, and begins reading out the last video signal at a given timing of the next sync signal (step S12). After all data are recorded on the RAM 109, the CPU 106 adds all video signals and records as one video signal on the RAM 109 (step S13).

The bit length required to video signal addition is so set that no clip is caused by overflow during the addition. For example, assuming one pixel is recorded by 10 bits in normal photographing and the number of exposure times is n in long-time exposure, a minimum of $(10+\log_2 n)$ bits are necessary in this long-time exposure. If the processing speed is sufficiently high, this addition can be performed during exposure after defect correction is completed. When this is the case, the area in the RAM 109 can be saved.

Subsequently, the CPU 106 performs signal conversion matching the image format to be recorded (step S20). The black level of the video signal is read out from the added data, and the converted data is recorded in another area of the RAM 109. The video signal converted into the given image format is supplied to the recording unit 110 and recorded on a recording medium.

Also, the CPU 106 performs the same signal conversion as in movie mode on the added signal and supplies the converted signal to the display unit 111 to display the photographed image (step S21). After the image is displayed and the switch S2 is released as in normal exposure photographing, the CPU 106 exits the main exposure mode and again passes on to the movie mode to perform arbitrary settings, thereby displaying the movie on the display unit 111.

In this sixth embodiment, when long-time photographing longer than a predetermined time is to be performed, the exposure-read-out process is dividedly performed a plurality of times. Consequently, without changing the input range of the analog stage, a video signal having a wide dynamic range can be obtained by digital signal processing in the subsequent stage. Accordingly, a video signal having a high S/N ratio can be obtained.

Figure 27:
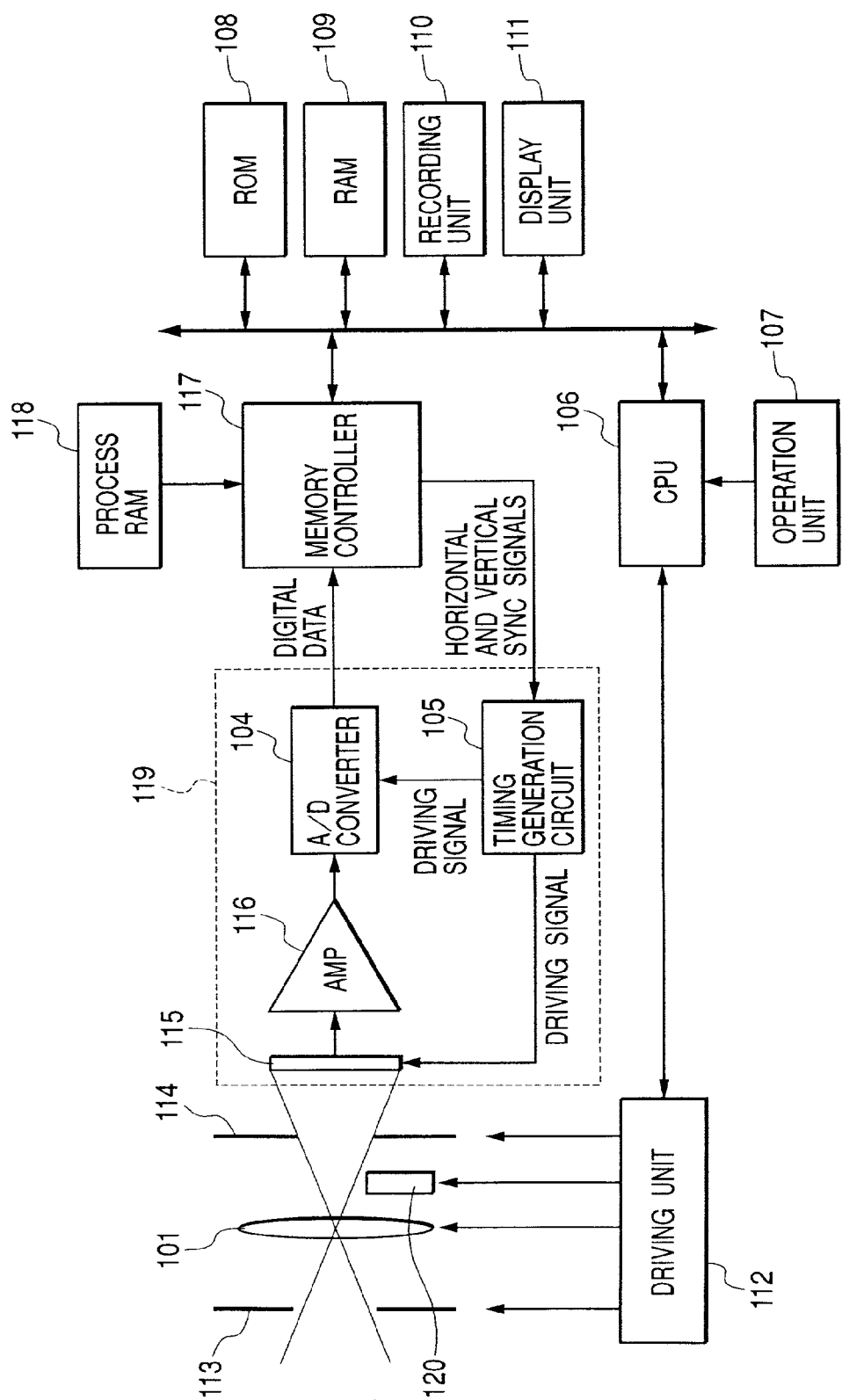
FIG. 27 is a block diagram showing the configuration of an image pickup apparatus according to the seventh embodiment.

FIG. 27 is a block diagram showing the configuration of a photographing apparatus according to the seventh embodiment. This photographing apparatus comprises a lens 101, an iris 113, a shutter 114, an AF sensor 120, a driving unit 112, a CMOSsensor 115 as an image pickup element, an AMP 116, an A/D converter 104, a timing generator (TG) 105, a memory controller 117, a process RAM 118 for the memory controller, a CPU 106, a ROM 108, a RAM 109, a recording unit 110, a display unit 111, and an operation unit 107.

The driving unit 112 drives the shutter 114 and the like. The TG 105 drives the image pickup element. The memory controller 117 converts and records a video signal. The recording unit 110 records a video signal. The display unit 111 displays a photographed image.

The operation unit 107 has a release button (not shown), switches for setting an aperture value, sensitivity, and photographing time, and a main switch. The release button is a two-step button by which switches S1 and S2 are turned on; the switch S2 is always turned on only after ON of the switch S1.

In this photographing apparatus, a photographing sequence is switched to one of a normal exposure mode and a long-time exposure mode in accordance with the exposure time. This switching is done in accordance with the exposure time set by the operation unit 107 or the exposure time calculated before photographing.

Figure 28:
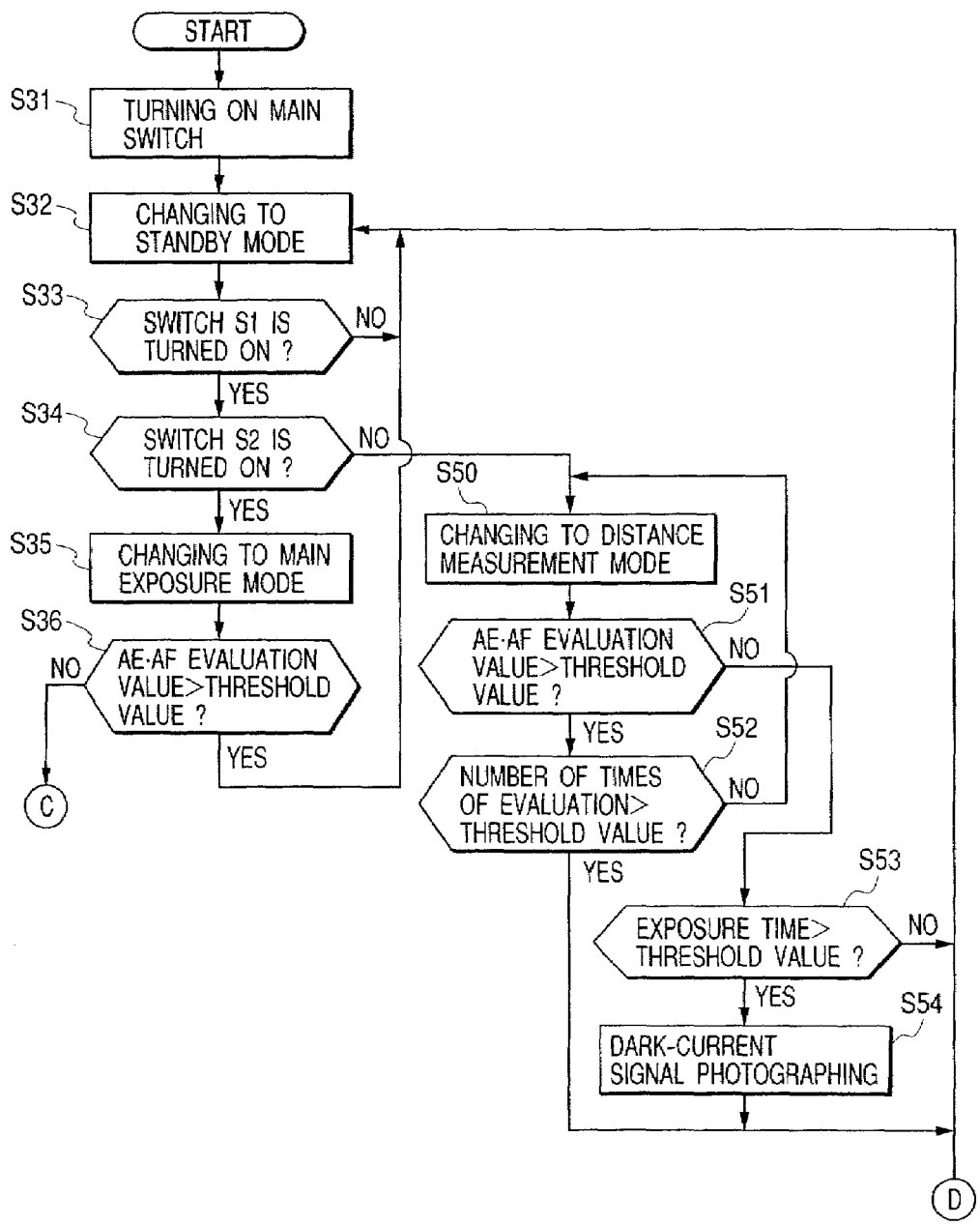
FIG. 28 is a flow chart showing the procedure of photographing in the seventh embodiment.
Figure 29:
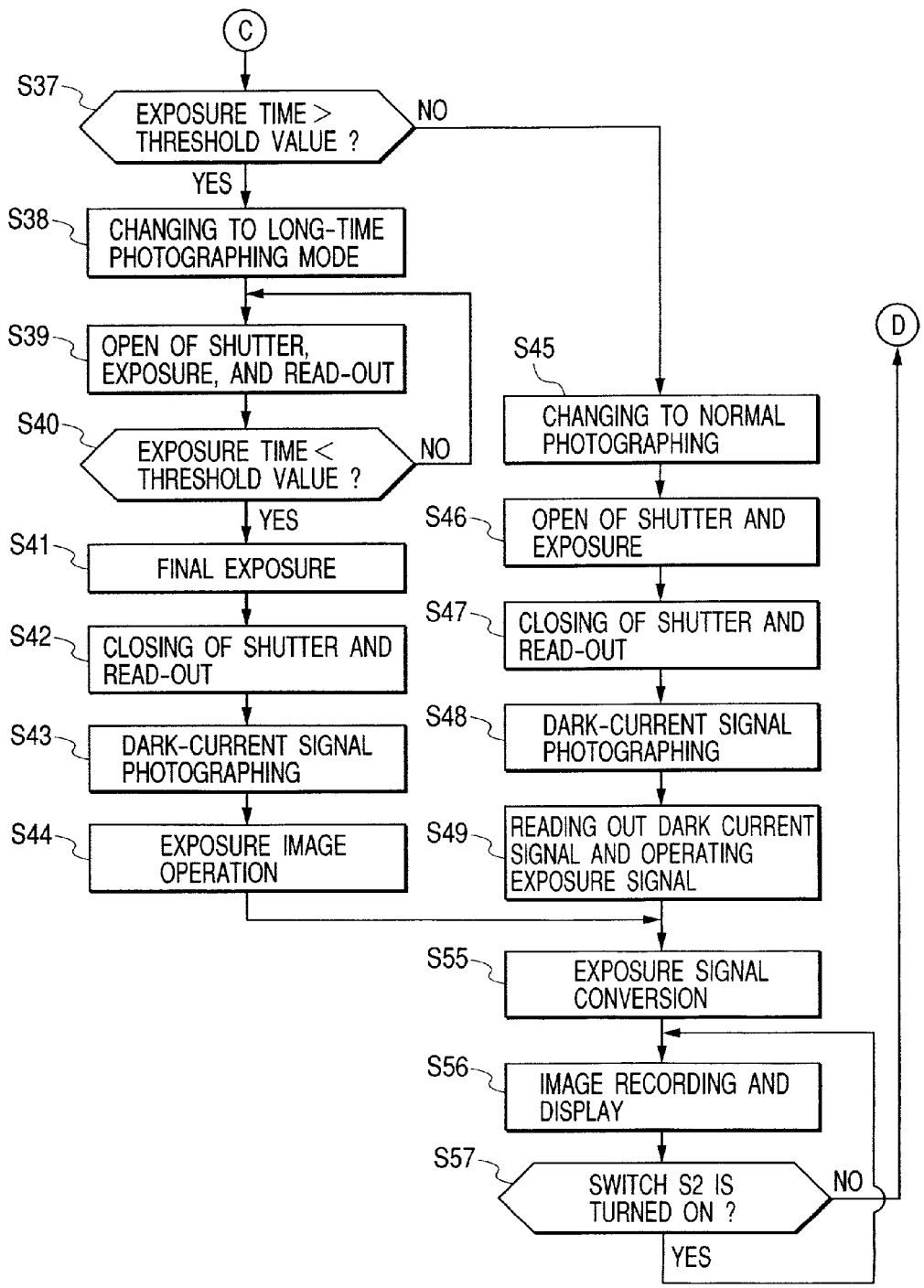
FIG. 29 is a flow chart showing the procedure of photographing continued from FIG. 28.

FIGS. 28 and 29 are flow charts showing the procedure of photographing in this seventh embodiment. This process program is stored in the ROM 108 and executed by the CPU 106.

First, photographing in normal exposure mode will be explained. When the main switch is turned on on the operation unit 107 (step S31), the CPU 106 initializes the individual components and proceeds to a standby mode (step S32). The CPU 106 then reads out a lens position and an aperture value from the driving unit 112 and performs settings for normal photographing for the memory controller 117. The CPU 106 displays the current status of the photographing apparatus on the display unit 111 and waits for an input from the operation unit 107 in this state.

The CPU 106 checks the statuses of the switches S1 and S2 (steps S33 and S34). If the switch S1 is not depressed, the flow returns to the processing in step S32. If the switch S1 is turned on and the switch S2 is kept off, the photographing apparatus passes on to a distance measurement mode (step S50). If the switches S1 and S2 are simultaneously depressed, the flow immediately passes on to a main exposure mode (step S35).

In distance measurement mode, the CPU 106 outputs an instruction for an AE•AF operation to the driving unit 112. The driving unit 112 drives the AF sensor 120 to sense a distance measurement signal from a video signal passing through the iris 113 and the lens 101, and sends the data to the CPU 106.

On the basis of the supplied data, the CPU 106 evaluates the AE•AF operation and checks whether the evaluation value is larger than a threshold value (step S51). If the evaluation value is larger than the threshold value, the CPU 106 checks whether the number of times of evaluation is larger than a threshold value (step S52). If the number of times of evaluation has not reached the threshold value, the flow returns to the processing in step S50. The CPU 106 calculates a control value for the AE•AF operation, supplies the calculated value to the driving unit 112, and again executes the AE•AF operation by controlling the iris 113 and the lens position. The CPU 106 performs this adjustment an arbitrary number of times until the evaluation value becomes an appropriate value. On the other hand, if it is determined in step S52 that the number of times of evaluation has reached the threshold value, the flow returns to the processing in step S32. If it is determined in step S51 that the AE•AF evaluation value is equal to or smaller than the threshold value, the CPU 106 turns on the power supply and sets the photographing standby state.

After completing the adjustment of the AE•AF operation, the CPU 106 checks whether the exposure time is longer than a threshold value (step S53). If the exposure time is equal to or shorter than the threshold value and the switch S1 is kept depressed, the CPU 106 maintains the current AE•AF state. If it is determined in step S53 that the exposure time is longer than the threshold value, the CPU 106 drives the CMOSsensor 115 to photograph a dark-current image (step S54). The CPU 106 terminates the AE•AF operation and again passes on to the standby state. If the switch S1 is released in this state and a predetermined time has elapsed, the CPU 106 turns off the power supply of the main photographing block.

On the other hand, if it is determined in steps S33 and S34 that the switch S2 is depressed after the switch S1 is depressed, the CPU 106 proceeds to the main exposure mode (step S35). The CPU 106 again executes the AE•AF operation and checks whether the AE•AF evaluation value is larger than a threshold value (step S36). If the evaluation value is larger than the threshold value, the flow returns to the processing in step S32. If the AE•AF evaluation value is equal to or smaller than the threshold value, the CPU 106 performs adjustment so that an image having appropriate image quality is obtained, and also calculates an exposure time t0 of the main exposure.

Figure 30:
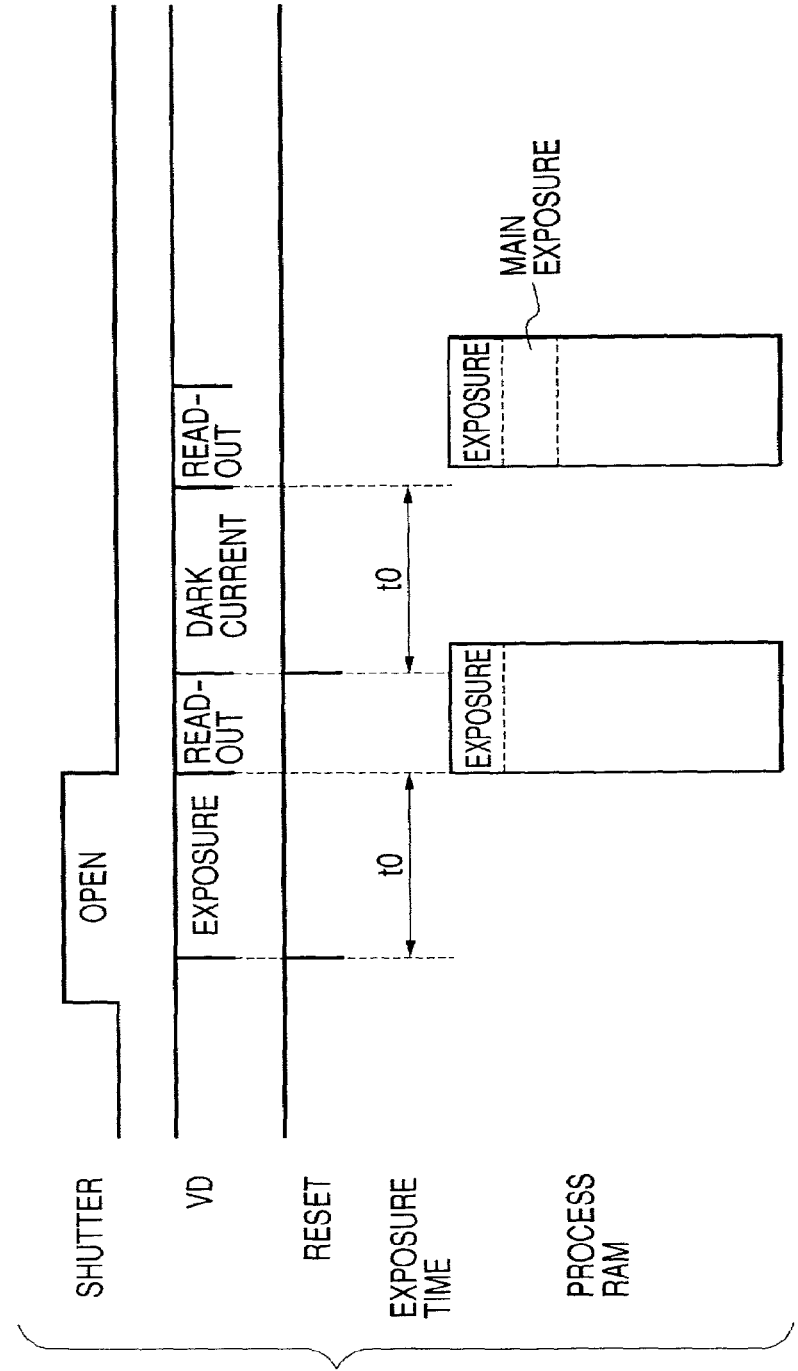
FIG. 30 is a timing chart showing photographing in normal photographing mode.

The CPU 106 checks whether the exposure time is longer than a threshold value (step S37). If the exposure time is equal to or shorter than the threshold value, the CPU 106 adjusts the AE•AF operation and proceeds to the normal photographing mode (step S45). FIG. 30 is a timing chart showing a photographing operation in normal photographing mode. First, the CPU 106 starts outputting a sync signal for main exposure from the memory controller 117, and starts main exposure read-out of the CMOSsensor 115.

After an arbitrary time for stabilizing the operations of the individual components has elapsed, the CPU 106 opens the shutter 114, outputs a reset signal to the CMOSsensor 115 at a given timing to perform a reset operation, discharges extra electric charge on the sensor, and begins exposure (step S46).

The CPU 106 closes the shutter 114 at a timing based on the previously calculated exposure time t0, thereby terminating the exposure. After terminating the exposure, the CPU 106 again inputs the sync signal to the CMOSsensor 115 to start reading out a video signal (step S47). Exposed data (exposed image) is converted into digital data via the AMP 116 and the A/D converter 104. The memory controller 117 temporarily records this digital data in an arbitrary area of the process RAM 118.

With the shutter 114 closed, the CPU 106 again drives the CMOSsensor 115 for the same time t0 as for the exposure, thereby photographing a dark-current image (step S48). After that, a read-out operation is performed. In this operation, the memory controller 117 reads out the exposed image previously recorded in the process RAM 118 from it in synchronism with read-out from the CMOSsensor 115, performs an arithmetic operation for the exposed image and the dark-current image to cancel a dark-current component in the exposure and read-out duration, and records this video signal as a main exposure image in another area of the process RAM 118 (step S49).

With this processing, the dark-current component and fixed pattern noise of the CMOSsensor 115 can be canceled from the recorded exposed image. After that, the CPU 106 supplies a command to the memory controller 117 to cause the memory controller 117 to perform signal conversion, which matches the image format to be recorded, on the data in the process RAM 118 and record the converted signal in another area of the process RAM 118 (step S55).

The video signal converted into the given image format is transferred to the recording unit 110 and recorded on a recording medium. The CPU 106 again supplies a command to the memory controller 117 to cause it to perform conversion for display on the data before being converted, and supplies the converted signal to the display unit 111 to display the photographed image (step S56).

At this point, the CPU 106 checks whether the switch S2 is kept depressed (step S57). If the switch S2 is kept depressed, the flow returns to the processing in step S56 to keep displaying the photographed image on the display unit 111 until the switch S2 is released. If it is determined in step S57 that the switch S2 is released, the CPU 106 leaves the main exposure mode, again proceeds to the standby state to perform arbitrary settings, and passes on to the photographing standby mode.

The long-time exposure mode will be described next. If in step S37 the exposure time set by the operation unit 107 or the exposure time measured in the distance measurement mode is longer than the preset threshold value, the CPU 106 begins an operation in long-time exposure mode.

Figure 31:
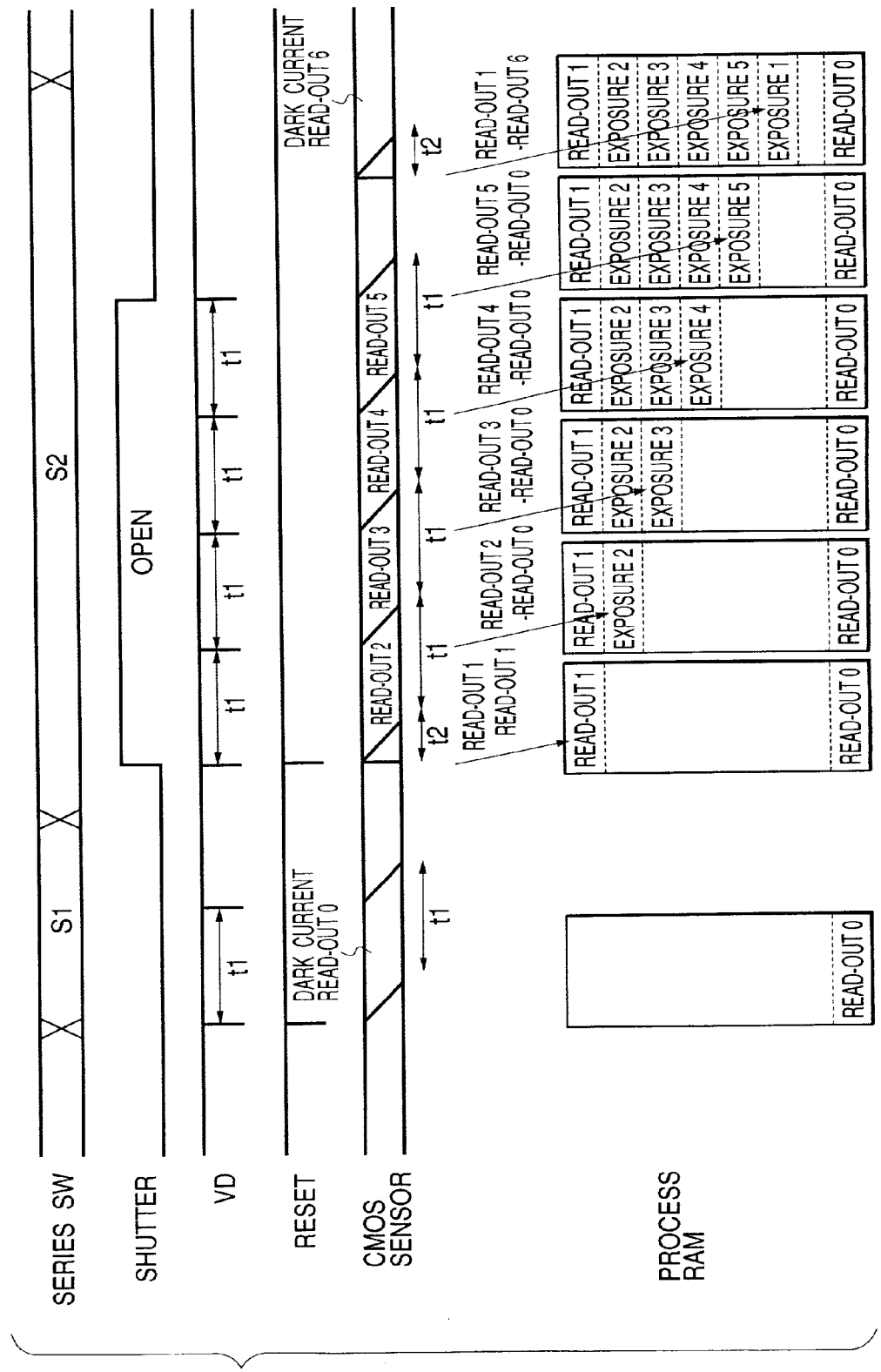
FIG. 31 is a timing chart showing photographing in long-time exposure mode.

FIG. 31 is a timing chart showing a photographing operation in long-time exposure mode. Referring to FIG. 31, the exposure time is four times a unit time t1. In long-time photographing of this embodiment, a dark-current signal of a given unit time t1, which contains a dark-current component and fixed pattern noise, is obtained before main exposure is started. During main exposure, exposure and read-out are performed by dividing the exposure time into predetermined fixed unit times t1. A plurality of output video signals and the dark-current signal are arithmetically operated to finally obtain a single video signal.

In the CMOSsensor 115, pixel signals are independently read out. Therefore, when continuous exposure is performed, an exposure time difference t2 exists between the read-out start and end positions. To correct this time difference, a readout signal immediately after the first exposure is used as an exposure signal in the arithmetic operation. After the exposure is completed, a dark current corresponding to the time difference t2 is again photographed and used in the correction.

With this processing, it is possible to prevent a narrowing of the dynamic range of an exposure signal in the A/D converter, which is caused by an increase in the dark-current component during long-time exposure. In addition, the dark-current component is canceled before memory recording to leave only a signal component. Accordingly, the memory area can be efficiently used without increasing the bit width during memory recording.

Referring to FIG. 31, all exposure signals are recorded. However, it is also possible to sequentially perform an arithmetic operation on a current exposure signal and an immediately preceding exposure signal whenever read-out is performed, and record the operation result in the memory. This can further improve the use efficiency of the memory. By contrast, the dark-current signal can be photographed and used in the arithmetic operation after main exposure is completed. When this is the case, the time for photographing the dark-current signal before main exposure can be omitted, so the shutter time lag can be reduced. The operation of long-time exposure will be described below with reference to the flow charts in FIGS. 28 and 29.

In the standby state in step S32, the switch S1 is depressed (step S33), and an exposure time longer than the unit time t1 is set on the basis of the distance measurement result (step S53). The CPU 106 supplies power to a main photographing block 119 to start photographing a dark-current signal (step S54). After driving this block 119 for the unit time t1, the CPU 106 reads out the time difference t2 and records the read-out dark-current signal in the process RAM 118. After recording this dark-current signal, the CPU 106 passes on to the standby state in step S32.

If the switch S2 is depressed after the switch S1 is turned on (step S34), the CPU 106 proceeds to the main photographing mode (step S35). The CPU 106 again executes the AE•AF operation and performs adjustment so that an image having appropriate image quality is obtained (step S36).

After the AE•AF adjustment, the CPU 106 checks whether the exposure time is longer than the threshold value (step S37). If the exposure time is longer than the threshold value, the CPU 106 proceeds to the long-time exposure mode (step S38). In this long-time exposure mode, the CPU 106 first begins outputting a sync signal for main exposure from the main controller 117, opens the shutter, outputs a reset signal to the CMOSsensor 115 to perform a reset operation, discharges extra electric charge on the sensor, and then starts exposure (step S39). The memory controller 117 reads out an exposure signal from the CMOSsensor 115 and at the same time reads out the dark-current signal recorded when the switch S1 is depressed. The memory controller 117 sequentially records a signal obtained by subtracting the dark-current signal from the exposure signal in a given space area of the process RAM 118.

Whenever recording of a video signal of a 1V period is completed, the CPU 106 calculates the remaining exposure time and compares this remaining exposure time with the threshold value equal to the maximum exposure time in a 1V period (step S40). If the remaining exposure time is equal to or longer than the threshold value, the flow returns to the processing in step S39 to again execute exposure and read-out. If the exposure time is shorter than the threshold value, the CPU 106 passes on to the final exposure stage (step S41).

After the calculated remaining exposure time has elapsed, the CPU 106 closes the shutter 114 to complete the exposure, and records the final exposure signal on the process RAM 118 (step S42). After the exposure is completed, the CPU 106 photographs a dark current to correct the read-out time difference and records this dark current on the process RAM 118 (step S43).

After this photographing is completed, the CPU 106 supplies to the memory controller 117 an operation instruction for the plurality of exposure signals in the process RAM 118. The memory controller 117 sequentially adds these exposure signals to form one main exposed image and records the image in the process RAM 118 (step S44).

In this state, referring to FIG. 31, the difference between a signal of read-out 1 and a signal of read-out 6 is calculated as exposure 1, the differences between a signal of read-out 0 and signals of read-out 2 to read-out 5 are calculated as exposure 2 to exposure 5, and signals of exposure 1 to exposure 5 are added as a main exposure signal.

Subsequently, as in normal exposure mode, the CPU 106 performs signal conversion, matching the image format to be recorded, on the data in the process RAM 118, and again records the converted data in another area of the process RAM 118 (step S55).

The video signal converted into the arbitrary image format is supplied to the recording unit 110 and recorded on a recording medium. Also, the CPU 106 again sends a command to the memory controller 117 to cause it to perform conversion for display on the data before being converted, and supplies the converted signal to the display unit 111 to display the photographed image (step S56). At this point, the CPU 106 checks whether the switch S2 is kept depressed (step S57). If the switch S2 is kept depressed, the CPU 106 keeps displaying the photographed image on the display unit 111 until the switch S2 is released. After the switch S2 is released, the CPU 106 leaves the main exposure mode, again proceeds to the standby state to perform arbitrary settings, and passes on to the photographing standby mode.

In the seventh embodiment as described above, in long-time photographing longer than a predetermined time, exposure and read-out are dividedly performed a plurality of times, thereby preventing a narrowing of the input range of the analog stage caused by a dark current increase. Also, a signal obtained by subtracting a dark-current signal from a readout signal is recorded in the memory. This ensures a wide dynamic range of an exposure signal without extending the word length of the memory. Consequently, the memory can be efficiently used without degrading the image quality. In addition, when read-out is performed n times in one exposure operation, an aperture control value can be multiplied by n.

In the present invention, even in long-time exposure photographing an output signal from an image pickup element can be photographed without exceeding the dynamic range of an analog unit in the subsequent stage. This can improve the quality of a photographed image.

The first to seventh embodiments described above can be applied to a system constituted by a plurality of devices (e.g., a host computer, interface, reader, and printer) or to an apparatus comprising a single device. Also, the software configurations and hardware configurations of the above embodiments can be appropriately switched. Furthermore, the above-mentioned embodiments of the present invention or the technical elements of these embodiments can be combined as needed. In the present invention, the scope of claims or the whole or part of the configurations of the embodiments can form a single apparatus, can combine with another apparatus, or can be a component of an apparatus.

The above embodiments can be applied to various forms of cameras such as an electronic still camera for photographing still images and a video movie camera for photographing motion images, to image pickup apparatuses other than cameras, to devices used in these cameras and image pickup apparatuses, and to components of these cameras and apparatuses.

Further, the above embodiments can also be achieved by providing a recording medium recording program codes of software for implementing the functions of the embodiments to a system or an apparatus. In this case, the program codes themselves read out from the storage medium implement the novel functions of the present invention, and the storage medium storing the program constitutes the invention.

In the above embodiments, the program codes shown in the flow charts are stored in the ROM as a storage medium. This storage medium for supplying the program codes is not limited to a ROM. For example, it is possible to use a floppy disk, hard disk, optical disk, magnetooptical disk, CD-ROM, CD-R, DVD, magnetic tape, nonvolatile memory card, or to download necessary data from another computer.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image input apparatus comprising:
   image pickup means for converting an optical image from an object into electrical image information and accumulating the electrical image information;
   shielding means for shielding said image pickup means from incidence of the optical image; and
   processing means for processing the image information from said image pickup means,
   wherein said processing means comprises:
   first image information acquiring means for acquiring first image information by closing said shielding means before image pickup,
   second image information acquiring means for repetitively acquiring, a first predetermined number of times with said shielding means open, second image information accumulated in said image pickup means within a predetermined period,
   first subtraction processing means for executing a subtraction process between each second image information acquired from said second image information acquiring means and the first image information acquired from said first image information acquiring means,
   first addition means for adding the subtraction results from said first subtraction processing means,
   third image information acquiring means for repetitively acquiring, a second predetermined number of times with said shielding means closed after image pickup, third image information accumulated in said image pickup means within a predetermined period,
   second subtraction processing means for performing a subtraction process between each third image information acquired from said third image information acquiring means and the first image information acquired from said first image information acquiring means, second addition means for adding the subtraction results from said second subtraction processing means, and adding-up means for adding up said first and second addition means.

2. An apparatus according to claim 1, wherein the first predetermined number of times and the second predetermined number of times are the same.

3. An apparatus according to claim 1, wherein said second addition means comprises repetitive addition means for continuously repetitively adding, a plurality of times, the subtraction results obtained by said second subtraction processing means.

4. An apparatus according to claim 1, wherein the second predetermined number of times is smaller than the first predetermined number of times.

5. An apparatus according to claim 4, wherein said processing means further comprises:

fourth image information acquiring means for acquiring fourth image information a third predetermined number of times with said shielding means closed, at timings different from the acquisition timings of said third image information acquiring means, normalizing means for normalizing the fourth image information acquired by said fourth image information acquiring means by the third predetermined number of times, and image processing means for performing image processing on the basis of the addition result from said first addition means and the normalization result from said normalizing means.

6. An image data processing method comprising:

an image pickup step of converting an optical image from an object into electrical image information and accumulating the electrical image information in image pickup means;

a shielding step of shielding said image pickup means from incidence of the optical image by using shielding means; and a processing step of processing the image information from said image pickup means, wherein said processing step comprises:

a first image information acquisition step of acquiring first image information by closing said shielding means before image pickup, a second image information acquisition step of repetitively acquiring, a first predetermined number of times with said shielding means open, second image information accumulated in said image pickup means within a predetermined period, a first subtraction processing step of executing a subtraction process between the repetitively acquired second image information and the first image information, a first addition step of adding the subtraction results obtained in the first subtraction processing step to calculate a first sum, a third image information acquisition step of repetitively acquiring, a second predetermined number of times with said shielding means closed after image pickup, third image information accumulated in said image pickup means within a predetermined period, a second subtraction processing step of performing a subtraction process between the repetitively acquired third image information and the first image information, a second addition step of adding the subtraction results obtained in the second subtraction processing step to calculate a second sum, and an adding-up step of adding up the first and second sums.

7. A method according to claim 6, wherein the first predetermined number of times and the second predetermined number of times are the same.

8. A method according to claim 6, wherein said second addition step comprises a repetitive addition step of continuously repetitively adding, a plurality of times, the subtraction results obtained in said second subtraction processing step.

9. A method according to claim 6, wherein the second predetermined number of times is smaller than the first predetermined number of times.

10. A method according to claim 6, wherein said processing step further comprises:

a fourth image information acquisition step of acquiring fourth image information a third predetermined number of times with said shielding means closed, at timings different from the acquisition timings in the third image information acquisition step, a normalization step of normalizing the fourth image information acquired in said fourth image information acquisition step by the third predetermined number of times, and an image processing step of performing image processing on the basis of the addition result in said first addition step and the normalization result in said normalization step.

* * * * *

UNITED STATES PATENT AND TRADEMARK OFFICE
CERTIFICATE OF CORRECTION

PATENT NO. : 7,023,479 B2 Page 1 of 1
APPLICATION NO. : 09/853706
DATED : April 4, 2006
INVENTOR(S) : Makoto Hiramatsu et al.

It is certified that error appears in the above-identified patent and that said Letters Patent is hereby corrected as shown below:

COLUMN 5
Line 10, "generate" should read --generating--.

COLUMN 10
Line 12, "CMOSprocess" should read --CMOS process--.

COLUMN 12
Line 28, "a" should read --$\alpha$--.

COLUMN 17
Line 29, "CMOSsensor" should read --CMOS sensor--.

COLUMN 18
Line 40, "CMOSsensor" should read --CMOS sensor--.

COLUMN 20
Line 1, "CMOSsensor" should read --CMOS sensor--.

Signed and Sealed this

Second Day of January, 2007

JON W. DUDAS
*Director of the United States Patent and Trademark Office*